United States Patent
Tamareselvy et al.

(10) Patent No.: US 11,214,758 B2
(45) Date of Patent: Jan. 4, 2022

(54) ITACONIC ACID POLYMERS AND COPOLYMERS

(71) Applicant: Lubrizol Advanced Materials, Inc., Cleveland, OH (US)

(72) Inventors: Krishnan Tamareselvy, Somerset, NJ (US); Feng-Lung Gordon Hsu, Broadview Hts., OH (US); Smita Brijmohan, Brecksville, OH (US); Francine I. Shuster, Brecksville, OH (US); John Ta-Yuan Lai, Broadview Hts., OH (US); Gaurav Mago, Avon Lake, OH (US); Yunpeng Zhu, Fair Lawn, NJ (US); Randy B. Collins, Akron, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 297 days.

(21) Appl. No.: 15/125,820

(22) PCT Filed: Mar. 13, 2015

(86) PCT No.: PCT/US2015/020408
§ 371 (c)(1),
(2) Date: Sep. 13, 2016

(87) PCT Pub. No.: WO2015/138872
PCT Pub. Date: Sep. 17, 2015

(65) Prior Publication Data
US 2017/0022451 A1    Jan. 26, 2017

Related U.S. Application Data

(60) Provisional application No. 61/953,239, filed on Mar. 14, 2014.

(51) Int. Cl.
*C11D 3/37* (2006.01)
*C08F 220/06* (2006.01)
(Continued)

(52) U.S. Cl.
CPC .............. *C11D 3/3757* (2013.01); *C08F 2/22* (2013.01); *C08F 220/06* (2013.01); *C08F 222/02* (2013.01)

(58) Field of Classification Search
CPC ............................ C11D 3/3757; C08F 222/02
See application file for complete search history.

(56) References Cited

U.S. PATENT DOCUMENTS 4,485,223 A * 11/1984 Walinsky .................. C02F 5/10
                                                                   525/902
4,647,396 A    3/1987 Denzinger et al.
(Continued)

FOREIGN PATENT DOCUMENTS

| CN | 1454909 A | 11/2003 |
|----|-----------|---------|
| CN | 101898837 | 12/2010 |

(Continued)

OTHER PUBLICATIONS

CN 101-898837 A. Dec. 1, 2010. An English Translation. (Year: 2010).*

(Continued)

*Primary Examiner* — Mark Eashoo
*Assistant Examiner* — M. Reza Asdjodi
(74) *Attorney, Agent, or Firm* — Christopher P. Demas; Teresan W. Gilbert

(57) ABSTRACT

The disclosed technology relates to esterified and/or ether containing polymers derived from itaconic acid that are free of the less reactive tri-substituted vinyl monomers (e.g., citraconic acid or mesaconic acid) that may be used, for (Continued)

example, as builders in detergent applications, such as in the personal and home care market.

17 Claims, 3 Drawing Sheets

(51) Int. Cl.
*C08F 222/02* (2006.01)
*C08F 2/22* (2006.01)

(56) References Cited

U.S. PATENT DOCUMENTS

| | | | | |
|---|---|---|---|---|
| 5,223,592 | A * | 6/1993 | Hughes | B01F 17/0028 526/240 |
| 7,459,496 | B2 * | 12/2008 | Hsu | C08F 2/24 524/439 |
| 8,673,277 | B2 * | 3/2014 | Tamareselvy | A61K 8/025 424/70.16 |
| 8,901,223 | B2 * | 12/2014 | Lai | C08F 20/04 524/388 |
| 2007/0202069 | A1 * | 8/2007 | Tamareselvy | A61K 8/892 424/70.12 |
| 2009/0007990 | A1 * | 1/2009 | Klippel | C09D 5/08 148/251 |
| 2009/0286947 | A1 * | 11/2009 | Durant | C08F 22/02 526/318.2 |
| 2017/0022451 | A1 * | 1/2017 | Tamareselvy | C08F 2/22 |

FOREIGN PATENT DOCUMENTS

| | | | | |
|---|---|---|---|---|
| CN | 101898837 | A * | 12/2010 | C08F 2/10 |
| CN | 101898837 | A | 12/2010 | |
| CN | 101955266 | A | 1/2011 | |
| CN | 102838215 | A | 12/2012 | |
| EP | 0079165 | | 5/1983 | |
| JP | 08-052496 | | 2/1996 | |
| JP | 2001252692 | A | 9/2001 | |
| JP | 2007-262403 | A | 10/2007 | |
| JP | 2011-132637 | A | 7/2011 | |
| WO | 2014/143773 | | 9/2014 | |
| WO | 2014/151439 | | 9/2014 | |
| WO | WO-2014151439 | A1 * | 9/2014 | A61Q 11/00 |

OTHER PUBLICATIONS

European Patent Office, International Search Report for PCT/US15/020408, dated May 27, 2015.

European Patent Office, Written Opinion of the International Searching Authority for PCT/US15/020408, dated May 27, 2015.

* cited by examiner

ITACONIC ACID POLYMERS AND COPOLYMERS

BACKGROUND OF THE INVENTION

The disclosed technology relates to polyitaconic acid homo- and co-polymers free of the less reactive tri-substituted vinyl monomers (e.g., citraconic acid or mesaconic acid) that are either esterified or contain ether linkages, and that may be used, for example, as builders in detergent applications, such as in the personal and home care market.

Builders are used in detergent cleaners, typically surfactant containing systems, to extend and improve the detergent cleaner's cleaning properties. The function of the builder is to remove calcium and other undesirable metal ions from washing solutions by sequestration or precipitation. In addition, builders can chelate ions of hardness, and provide a pH buffering function and some anti-redeposition functionality that can enhance cleaning performance. Inorganic sodium tripolyphosphate (STPP) is a conventional builder that has historically been used in detergent cleaners. However, there are perceived environmental issues associated with STPP and its use has been reduced or eliminated from many detergent products, such as, for example, dishwashing detergents. The loss of STPP as a builder has created immediate product performance issues in the dishwashing detergent market, particularly in relation to a lack of cleaning efficiency and film formation due to a failure to remove metal ion residue.

Due to the lack of performance in current phosphate free detergent systems, there is an unmet need in the market for an improved functional builder. A sustainable or "green" product solution with improved performance is highly desirable.

There are several process patents in the prior art that provide processes to produce itaconic acid (IA) homopolymer. A common thread in the prior art is the use of neutralization in the process. For example, U.S. Pat. No. 5,223,592 reports that the critical aspect in preparing itaconic acid is to provide complete neutralization of an itaconic acid type monomer prior to conducting the polymerization reaction. Complete neutralization is identified as having two moles of base neutralizer for each mole of itaconic acid. Similarly, U.S. Pat. No. 5,336,744 discloses a process using from 5 to 50% neutralization along with a polyvalent metal ion and an initiator. Another US patent, U.S. Pat. No. 7,910,676 from the University of New Hampshire teaches a process using a partial degree of neutralization (25-75%) and an initiator to make a high molecular weight polymer. The itaconic acid polymerization process involving a neutralization step according to the foregoing references leads to a rearrangement of di-substituted itaconic acid derived monomers to the less reactive tri-substituted vinyl monomers (e.g., citraconic acid or mesaconic acid derived monomers as shown in formula I below). Such isomerization to the tri-substituted monomers results in polymers with unreacted residuals and subsequently causes reduced chelating efficiency.

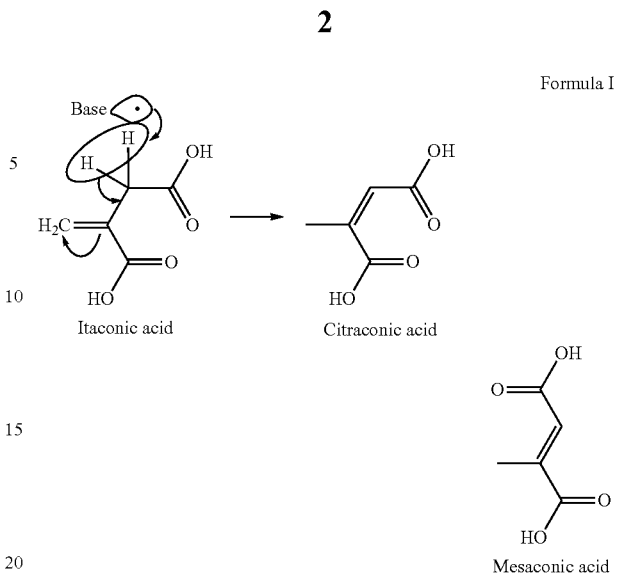

Formula I

In contrast, polymerization of itaconic acid in acidic medium does not favor the rearrangement of itaconic to less reactive citraconic acid. Polymerization of itaconic acid in an acidic medium has been reported in "Polymerization of itaconic acid and some of its derivatives" Marvel et al, Journal of Organic Chemistry, (1959), 24, 599, and in "Polymerization of Itaconic Acid In Aqueous Solution: Structure Of The Polymer And Polymerization Kinetics At 25° C. Studied By Carbon-13 NMR," Grespos et al, Makromolekulare Chemie, Rapid Communications (1984), 5(9), 489-494. However, these methods have disadvantages such as poor conversion with lengthy polymerization times and corrosivity issues. Similarly, WO 2001/21677 describes an itaconic acid polymerization comprising a free radical generator (persulfate) and a phosphorous-containing reducing agent, which gives a product with undesirable phosphorous components.

U.S. Pat. No. 4,485,223 teaches an "essentially homogenous" (meth)acrylic acid/itaconic acid copolymer. The process taught in the '223 patent teaches a post-neutralization step, and process temperatures ranging from 80 to 120° C., as well as an initiator amount of from 5 to 20 mole %. The level of initiator required in the polymerization step of the '223 process results in a corrosive copolymer solution (pH<1), which poses significant safety concerns from a handling point of view that would make scale-up difficult. Moreover, the high initiator level used in the polymerization taught in the '223 patent gives a dark colored copolymer with a strong unpleasant sulfur odor that would not be suitable for use in the personal care or home care market. The high temperatures used in the '223 process causes the initiator to decompose quickly, causing oxidized and/or sulfurized itaconic acid impurities and resulting in an inferior product.

Itaconic acid polymers and co-polymers having improved purity, and being free of tri-substituted vinyl monomer impurities that provide improved chelating capabilities and hydrophobic dispersion, along with methods of preparing the same would be desirable.

SUMMARY OF THE INVENTION

The disclosed technology, therefore, solves the problem of inefficient ion binding capacity by providing polymers, co-polymers, and/or terpolymers that are derived from substantially pure itaconic acid and that are free of tri-substituted vinyl monomer impurities and therefore suitable to personal care and home care applications.

Further, it has now been found that itaconic acid polymers and copolymers free of tri-substituted vinyl monomer impurities and that are esterified and/or contain ether linkages provide improved dispersancy of particulates, for example, in detergent applications such as laundry and dish detergents, as well as improved viscosity profiles compared to the non-esterified versions of the same polymer.

In one embodiment, there is provided polymer composition comprising monomer units derived from itaconic acid. Preferably, the polymer is free of tri-substituted vinyl monomers, such as citraconic acid and/or mesaconic acid isomers.

The polymer composition may further comprise co-monomer units. Suitable co-monomer units can be those derived, for example, from acrylic acid, methacrylic acid, 2-acrylamido-2-methylpropane sulfonic acid (AMPS™ a registered trademark of the Lubrizol Corporation), sodium styrene sulfonate, or salts and/or combinations thereof. Preferably, the monomer units derived from itaconic acid are present at greater than 50 mole %, for example, between 60 and 70 or 80 mole %, and the co-monomer units are present at less than 50 mole %, such as from between 15 or 20 and 30 or 40 mole %. In one embodiment, the polymer composition can include monomer units derived from itaconic acid and (meth)acrylic acid at from about 90 to about 99.9 mole % and monomer units derived from AMPS and/or sodium styrene sulfonate at from about 0.1 to about 10 mole %.

From about 0.1 to about 60% of the total acid groups from all monomers in the polymer can be either esterified, contain an ether linkage, or a combination thereof.

The polymer composition preferably has a number average molecular weight (Mn) of between about 500 and 100,000 and is included in an aqueous polymer solution comprising the polymer composition and water. When in polymer solution, the solution preferably has a pH of greater than 1.8 and is transparent or substantially transparent.

In a further aspect, the disclosed technology provides an polymer solution of the itaconic acid polymer or copolymer. The polymer solution can contain less than 0.5% w/w unreacted monomer based on the total weight of the polymer present in the solution, and preferably, can be characterized by a pH of greater than 1.8.

In an embodiment, the polymer can contain greater than 25 mole % monomer units derived from itaconic acid; less than 75 mole % monomer units derived from acrylic acid; and less than 10 mole % of (meth)acrylic acid ester monomer units, allyl ether monomer units, and combinations thereof.

In a further embodiment, the polymer can include an additive, such as, for example, a starch additive, polyvinyl alcohol additive of less than 100,000 Mn, polyhydric alcohol additive, or mixtures thereof.

In an aspect, the disclosed technology provides a process for preparing a polymer solution of the itaconic acid polymer of any previous claim comprising: preparing a monomer solution of a monomer in an aqueous medium, wherein the monomer solution contains itaconic acid monomer and polymerizing at a polymerization temperature of greater than about 60° C. in the presence of from about 0.01 to about 5 mole % polymerization initiator, based on the total amount of said monomers.

In an embodiment the aqueous medium can include at least one alcohol, such as, for example, IPA.

In another embodiment, the monomer solution can include greater than about 25 mole % of the itaconic acid monomer and less than about 75 mole % of a co-monomer composition comprising acrylic acid, AMPS and/or sodium styrene sulfonate, salts thereof, esters thereof, allyl ether monomers, and combinations thereof.

In one aspect, the co-monomer composition can be added to the monomer solution over a period of from about 2 to 16 hours.

In an embodiment the monomer solution can be held at a polymerization temperature of less than 100° C.

In an embodiment, the co-monomer composition and at least half of said initiator can be added essentially continuously to said monomer solution.

In an embodiment the itaconic acid monomer and from about 2 to about 25% of said initiator can be dissolved in the aqueous medium and the remainder of the initiator can be introduced over said period.

In one embodiment, the itaconic acid monomer and from about 0.5 to about 10 wt % or from about 2 to about 25% of the initiator are dissolved in the medium and the remainder of the initiator is introduced over the period.

In an embodiment, the initiator is a redox system. In a preferred embodiment, the redox system contains a sodium persulfate oxidizer and a reducer including a mixture of a disodium salt of 2-hydroxy-2-sulfinatoacetic acid and sodium sulfite. In another embodiment the initiator is a redox system of a sodium persulfate oxidizer and tertiary butyl perpivalate oxidizer and a reducer comprising a mixture of a disodium salt of 2-hydroxy-2-sulfinatoacetic acid and sodium sulfite.

In some embodiments, the process can include the additional step of pre-neutralizing the monomer solution with less than 5 mole % of a neutralizer per total acid group from all monomers present in the monomer solution. In some embodiment, the neutralizer is a base having less than 25 mole % carboxylic acid functionality.

The process can further include a step of post-neutralizing the resultant polymer solution with up to 120% of a neutralizer per acid group in the polymer solution.

In another embodiment, the process can include the additional step of converting the polymer solution to a powder by either (i) granulation of polymer with inorganic bases or (ii) spray-drying the pre-neutralized polymer solution.

In an embodiment the process can include the additional step of adding an additive, such as starch, polyvinyl alcohol of less than 100,000 Mn, a polyhydric alcohol, or mixtures thereof to the monomer reaction mixture.

An additional aspect of the disclosed technology is a dishwashing detergent comprising the polymer or copolymer, or polymer solution containing the itaconic acid polymer or copolymer. Similarly, the disclosed technology provides a laundry detergent and a hard surface cleaner comprising the itaconic acid polymer or copolymer, or polymer solution containing the itaconic acid polymer or copolymer. The dishwashing detergent can be in the form of a gel, liquid, powder, bars, paste, hard or soft compressed monolayered tablet, hard or soft compressed multilayered tablet, single phase unidose detergent, multiphase unidose, or unit dose. The laundry detergent can be in the form of a gel, liquid, powder, bars, paste, hard or soft compressed monolayered tablet, hard or soft compressed multilayered tablet, single phase unidose detergent, multiphase unidose, or unit dose.

In one embodiment, the polymer composition and/or polymer solution can be employed in a method of chelating ions by providing the polymer composition or polymer formulation to a cosmetically, pharmaceutically or industrially acceptable composition.

In a further embodiment, the technology provides a method of providing industrial water treatment and/or industrial water purification comprising adding a deposit control agent comprising an itaconic acid polymer as described above to a water solution in need of industrial water treatment and/or industrial water purification. In such an embodiment, the method can include blending the itaconic acid polymer with other known scale inhibitors and/or dispersant agents comprising phosphonates, polymaleic and/or polyacrylic acid homo- or co-polymers; and/or corrosion inhibitors comprising tolyltriazole, polyphosphates, phosphonates, and molybdate.

In a still further embodiment, the technology provides a method of providing rheology modification in drilling operations and/or slurry transport applications comprising adding to a drilling mud or slurry an itaconic acid polymer and operating a drill with the drilling mud or slurry. In such an embodiment, the method can include blending the itaconic acid polymer with other known scale inhibitors and/or dispersant agents comprising phosphonates, polymaleic and/or polyacrylic acid homo- or co-polymers; and/or corrosion inhibitors comprising tolyltriazole, polyphosphates, phosphonates, and molybdate.

DETAILED DESCRIPTION OF THE INVENTION

Figure 1:
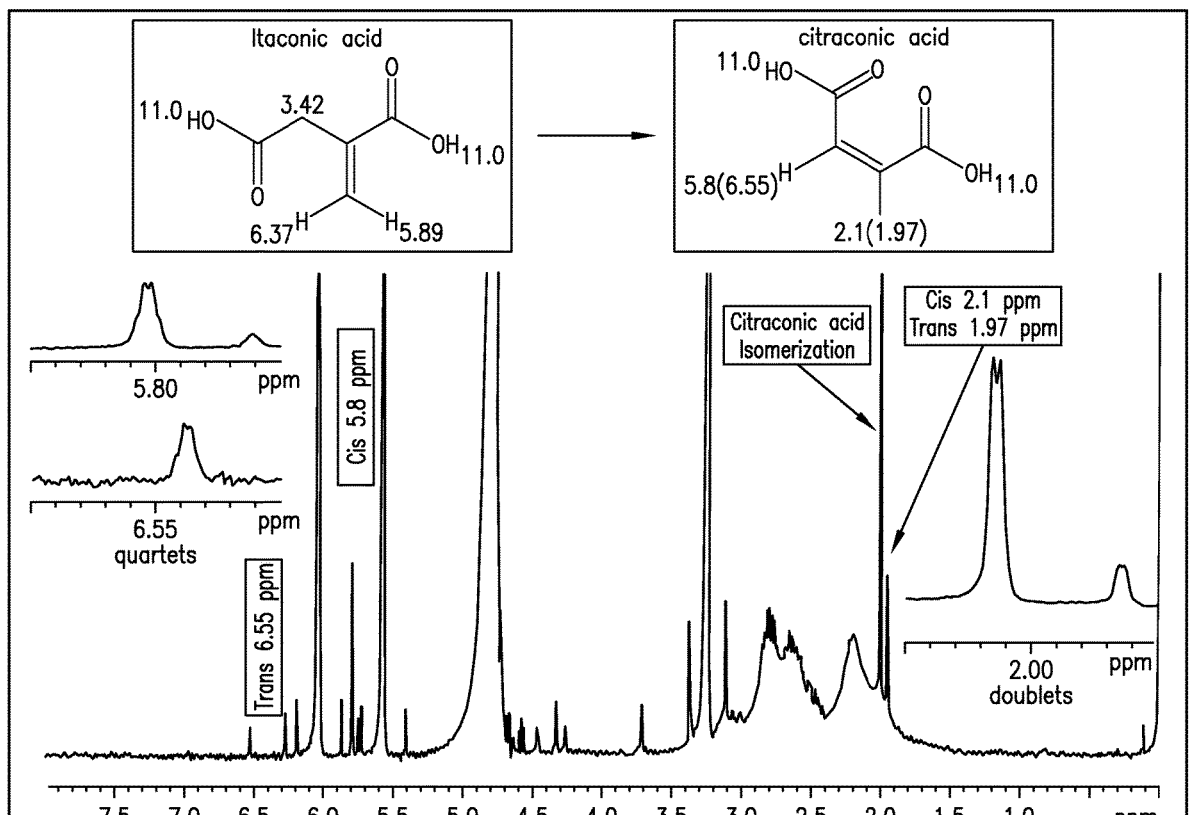
FIG. 1: $^1$H NMR of Comparative Sample I
Figure 2:
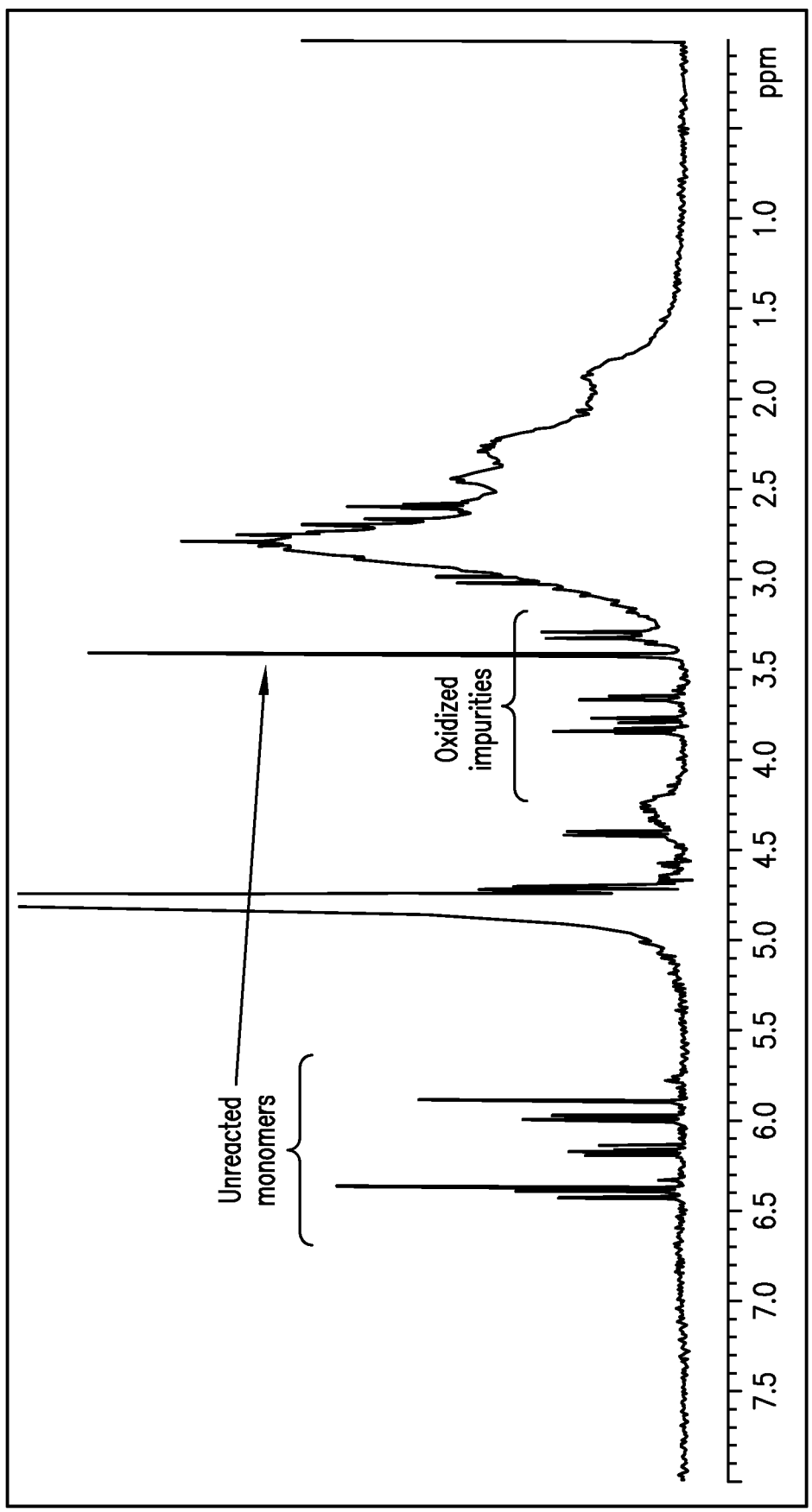
FIG. 2: $^1$H NMR of Comparative Sample II
Figure 3:
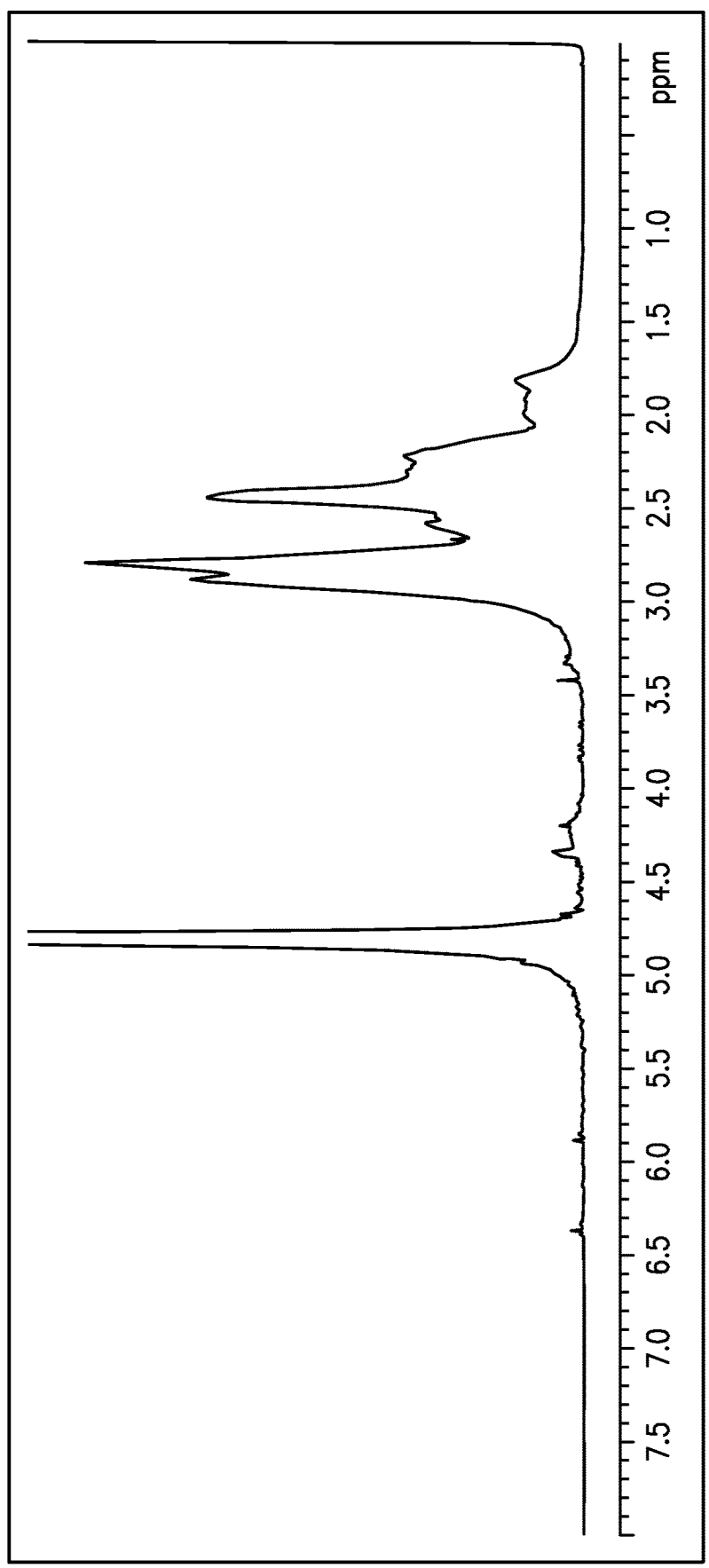
FIG. 3: $^1$H NMR of Sample 5

Various preferred features and embodiments will be described below by way of non-limiting illustration.

A first aspect of the invention is a homogenous or substantially homogenous polymer. As used herein, the term polymer can include any type of polymer, such as, for example, random or block copolymers, terpolymers or other polymers containing more than two monomers ("improved polymers"). The improved polymer can provide improved builder efficiency for personal care, home care, health care, and industrial and institutional (I&I) applications. The improved polymers can consist of itaconic acid derived monomers, or consist of, consist essentially of, or comprise itaconic acid derived monomers and an acrylic acid, methacrylic acid or 2-acrylamido-2-methylpropane sulfonic acid (AMPS) and/or sodium styrene sulfonate derived co-monomers or other carboxylic acid containing co-monomers, such as maleic acid and fumaric acid.

As used herein, (meth)acrylic acid refers to both acrylic acid and methacrylic acid. Further, when discussing itaconic acid, (meth)acrylic acid, and AMPS and sodium styrene sulfonate, in relation to a polymer, copolymer and/or terpolymer, it is to be understood that the reference to the acid form encompasses the monomer unit derived therefrom. Thus, for example, a polymer of itaconic acid and acrylic acid is to be understood as comprising monomer units derived from itaconic acid and monomer units derived from acrylic acid.

Itaconic acid is an organic compound which is non-toxic and may be derived from renewable resources. Itaconic acid may be obtained by the distillation of citric acid or by the fermentation of carbohydrates such as glucose using *Aspergillus terreus*. Itaconic acid may be referred to as methylenesuccinic acid or 2-methylidenebutanedioic acid. Itaconic acid may be represented by the formula $C_5H_6O_4$ or by the formula $CH_2=C(COOH)CH_2COOH$.

The improved polymer may be a homopolymer wherein the polymer backbone comprises structural units derived from itaconic acid, or an anhydride, ester, or salt thereof (collectively referred to as itaconic acid). The improved polymer also may be a copolymer or terpolymer wherein the backbone of the polymer comprises structural units derived from itaconic acid, or an anhydride, ester or salt thereof and at least one of (meth)acrylic acid, and their anhydrides, esters and salts, AMPS, and/or sodium styrene sulfonate and salts thereof (collectively referred to as (meth)acrylic acid and AMPS).

The salts of (meth)acrylic acid and AMPS can be the same as the salts of the itaconic acid, namely sodium, potassium or ammonium salts and alkylated ammonium salts such as triethyl ammonium salt, and alkylated hydroxyl ammonium salts such as triethanol ammonium salt, and the like.

The improved polymer can contain monomer units derived from itaconic acid. Preferably, the improved polymer can contain greater than about 25 mole %, 50 mole %, 60 mole %, or greater than 70 mole %, monomer units derived from itaconic acid. In some embodiments, the improved polymer can contain from about 30 mole % to about 60 mole %, or 35, 50 or 60 mole % to about 70 or 80 mole % monomer units derived from itaconic acid. In certain instances the monomer units derived from itaconic acid can be from about 1 to about 99 mole %, or about 5 to about 95 mole %, or even about 10 to about 90 mole %, and in some instances from about 20 to about 80 mole %. In certain instances about 0.1 to about 15 or 20 mole %, or from about 0.5 or 1.0 to about 2.5 or 5 or 10 mole % of the itaconic acid derived monomer units can be replaced by AMPS derived monomer units.

The improved polymer can optionally contain co-monomer units derived from (meth)acrylic acid or other carboxylic acid containing co-monomers, such as maleic acid and fumaric acid. The amount of co-monomer units derived from (meth)acrylic acid or other carboxylic acid containing co-monomers, such as maleic acid and fumaric acid, can be up to about 75 mole %, 50 mole % of the copolymer and/or terpolymer, or up to about 30 or 40 mole %. In certain instances the co-monomer units derived from (meth)acrylic acid can be from about 15 or 20 or 25 mole % to about 30 or 40 or 50 mole % of the copolymer or terpolymer composition. In certain instances about 0.1 to about 15 or 20 mole %, or from about 0.5 or 1.0 to about 2.5, or 5 or 10 mole % of the (meth)acrylic acid derived co-monomer units can be replaced by AMPS derived co-monomer units.

The co-monomer units derived from (meth)acrylic acid or other carboxylic acid containing co-monomers, such as maleic acid and fumaric acid can be in the form of esters, such as, for example, methyl acrylate, ethyl acrylate, 2-ethylhexyl acrylate and the like. Representative ester monomers include, but are not limited to, methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, isodecyl (meth)acrylate, lauryl (meth)acrylate, cetyl (meth)acrylate, stearyl (meth)acrylate, and behenyl (meth)acrylate, 2-hydroxyethyl(meth) acrylate, 3-hydroxypropyl(meth)acrylate, 4-hydroxybutyl (meth)acrylate, lauryl polyethoxylated methacrylate (LEM), cetyl polyethoxylated methacrylate (CEM), cetearyl polyethoxylated methacrylate (CSEM), stearyl polyethoxylated (meth)acrylate, arachidyl polyethoxylated (meth)acrylate, behenyl polyethoxylated methacrylate (BEM), methoxypolyethyleneglycol methacrylate available under the product names Visiomer® MPEG 750 MA W, MPEG 1005 MA W, MPEG 2005 MA W, and MPEG 5005 MA W from Evonik Röhm GmbH, Darmstadt, Germany; Bisomer® MPEG 350 MA, and MPEG 550 MA from GEO Specialty Chemicals, Ambler Pa.; Blemmer® PME-100, PME-200, PME-400, PME-1000, PME-4000 and mixtures thereof. In the form of esters, the co-monomer can be present at up to about 3 mol %, or up to 5 mol %, or up to 10 mol %, and even up to 20 mol % of the copolymer and/or terpolymer, such as from 0.01 to 10 or 20 mol %, or from about 0.1 to about 5 mol %, or even from about 1 to about 3 mol %.

The improved polymer can also optionally contain co-monomer units derived from AMPS and/or sodium styrene sulfonate. The amount of co-monomer units derived from AMPS and/or sodium styrene sulfonate can be up to about 75 mole %, 50 mole % of the copolymer and/or terpolymer, or up to about 30 or 40 mole %. In certain instances the co-monomer units derived from AMPS and/or sodium styrene sulfonate can be from about 15 or 20 or 25 mole % to about 30 or 40 or 50 mole % of the copolymer or terpolymer composition. In some instances, the AMPS and/or sodium styrene sulfonate co-monomer units can replace a portion of the itaconic acid monomers, (meth)acrylic acid monomers, or a combination thereof. The AMPS and/or sodium styrene sulfonate derived monomers can replace from about 0.1 to about 20 mole %, or about 0.5 to about 10 or 15 mole %, or about 1 to about 2.5 or 5 mole % of the itaconic acid monomers, (meth)acrylic acid monomers, or a combination thereof, in which case the other co-monomers will be in the range of about 80 or 85 to about 99.9 mole %, or about 90 or 95 to about 99.5 mole %, or about 97.5 to about 99% of the copolymer and/or terpolymer.

Allyl ethers can also be included in the improved polymers as co-monomer units. In an embodiment, the improved polymer can include co-monomer units derived from an allyl ether, such as, for example, allylbutyl ether, allyl olefinyl ether, and/or alkoxylated allyl ether. Representative allyl ether monomers are allyl butyl ether, allyloxy ethanol, and allyl PEG-PPG ethers (alkoxylated allyl ether). Examples of allyl PEG-PPG ethers that are commercially available under the trade names Emulsogen® R109, R208, R307, RAL109, RAL208, and RAL307 sold by Clariant Corporation; BX-AA-E5P5 sold by Bimax, Inc.; and combinations thereof. EMULSOGEN® R109 is a randomly ethoxylated/propoxylated 1,4-butanediol vinyl ether having the empirical formula $CH_2=CH-O(CH_2)_4O(C_3H_6O)_4(C_2H_4O)_{10}H$; Emulsogen® R208 is a randomly ethoxylated/propoxylated 1,4-butanediol vinyl ether having the empirical formula $CH_2=CH-O(CH_2)_4O(C_3H_6O)_4(C_2H_4O)_{20}H$; Emulsogen® R307 is a randomly ethoxylated/propoxylated 1,4-butanediol vinyl ether having the empirical formula $CH_2=CH-O(CH_2)_4O(C_3H_6O)_4(C_2H_4O)_{30}H$; Emulsogen® RAL109 is a randomly ethoxylated/propoxylated allyl ether having the empirical formula $CH_2=CHCH_2O(C_3H_6O)_4(C_2H_4O)_{10}H$; Emulsogen® RAL208 is a randomly ethoxylated/propoxylated allyl ether having the empirical formula $CH_2=CHCH_2O(C_3H_6O)_4(C_2H_4O)_{20}H$; Emulsogen® RAL307 is a randomly ethoxylated/propoxylated allyl ether having the empirical formula $CH_2=CHCH_2O(C_3H_6O)_4(C_2H_4O)_{30}H$; and BX-AA-E5P5 is a randomly ethoxylated/propoxylated allyl ether having the empirical formula $CH_2=CHCH_2O(C_3H_6O)_5(C_2H_4O)_5H$. Other examples of allyl ether monomer is sodium 1-allyloxy-2-hydroylpropyl sulfonate (COPS1) sold by Rhodia and allyl ether of alkyl poyoxyethylene glygol containing sodium sulfate side chain (HITENOL KH-10) sold by Dai-Ichi Kogyo Seiyaku Co., Ltd, Japan. The amount of co-monomer units derived from ethers can be up to about up to 3 mol %, or up to 5 mol %, or up to 10, and even up to 20 mol % of the copolymer and/or terpolymer, such as from 0.01 to 10 or 20 mol %, or from about 0.1 to about 5 mol %, or even from about 1 to about 3 mol %.

The improved polymers are free of, or substantially free of moieties of tri-substituted vinyl monomer isomers of itaconic acid, such as citriconic acid and mesaconic acid. By "substantially free of moieties of tri-substituted vinyl monomer isomers," it is meant that there is an insufficient amount of the isomer moieties present in the improved polymer to effect the efficacy of the improved polymer, such as, for example, less than 0.5 mole %, or 0.1 mole %, or less than 0.05 mole %, or less than 0.01 mole %, based on the number of monomer units in the improved polymer.

Further, the improved polymer solution will include less than 0.5% w/w unreacted monomer and co-monomer based on the total weight of the polymer present in the solution, or less than 0.25% w/w, or free or substantially free of unreacted monomer and co-monomer. Here again, by "substantially free of unreacted monomer" it is meant that there is an insufficient amount of unreacted monomer present in the improved polymer solution to affect the efficacy of the solution, such as, for example, less than 0.5 mole %, or 0.1% w/w, or less than 0.05% w/w, or less than 0.01% w/w, or less than 0.001% w/w, based on the weight of the improved polymer in the solution, or from less than 2.5 or 2.0 wt %, or 1 wt %, or less than 0.5 wt %, or less than 0.1 wt. %.

The improved polymers can have number average molecular weights (Mn) of from about 500 to 100,000, preferably from about 1000 to 50,000, more preferably from about 2500 to about 25,000. In some embodiments the Mn of the improved polymers can be from about 500 to about 10,000 or 1000 to about 5000. Likewise, the improved polymer can have a polydispersity of from about 1 to 20, more preferably 1 to 10, or 1 to 8, 1 to 5 or 1 to 3.

The improved polymers can be prepared by polymerizing itaconic acid on its own, or a major amount of itaconic acid monomer with at least one of (meth)acrylic acid co-monomer, AMPS co-monomer, or combinations thereof. The polymerization process can provide homogenous, substantially homogenous, random or block polymers and copolymers.

Block copolymers are defined by the art as polymers derived from two or more different monomers in which multiple sequences, or blocks, of the same monomer alternate in series with the different monomer blocks. Block copolymers can contain two blocks (di-block), three blocks (tri-block), or more than three blocks (multi-block). Block copolymers can be alternating copolymers with the two or more different monomers along the polymer backbone at regularly alternating intervals. There are also periodic copolymers in which the two or more monomers are arranged in a regularly repeating sequence, and statistical copolymers in which the sequence of the two or more different monomers repeat based on a statistical rule. Preferably, the block copolymer created according to the process of the invention is an alternating multi-block copolymer.

In one aspect of the invention, the improved polymers of the invention can be synthesized by free radical polymerization of the monomer mixture described above. The polymers can be prepared via solution, dispersion, precipitation, mass or emulsion (or inverse emulsion) polymerization techniques that are well-known in the polymer art.

In one aspect the present polymers are prepared by solution polymerization in an aqueous medium. By aqueous medium it is meant solvents such as water and alcohols.

The polymerization can be carried out in a variety of solvents, such alcohols, ethers, esters, aromatic solvents, glycols, glycol ethers, and glycol esters, all of which are considered aqueous media herein. Preferred solvents include ethyl alcohol, isopropyl alcohol, t-butyl alcohol, ethyl acetate, methyl acetate, butyl acetate, benzene, toluene, methyl ethyl ketone, and methylene choride. These solvents can be used also in combination with hydrocarbon solvents such as hexane, cyclohexane, mineral spirits, and the like. A preferred aqueous medium is water. One further preferred solvent is an isopropyl alcohol and water mixture. Isopropyl alcohol is another preferred aqueous medium.

The polymerization process is completed in an aqueous medium in the presence of a polymerization initiator and at lower temperatures than taught in the prior art. In general, the (meth)acrylic acid, AMPS, combinations thereof and the initiator are added separately from the itaconic acid, but they can also be added simultaneously with the itaconic acid. Acrylic acid, methacrylic acid and their esters, allyl ether monomers AMPS and sodium styrene sulfonate monomers can be interchanged or mixed in the process to give products with essentially the same molecular weight and improved metal ion-binding characteristics for a copolymer of given AMPS or (meth)acrylic acid/itaconic acid mole ratio.

The process can include a pre-neutralization step in which the pH of the polymerization solution is neutralized with a neutralizer, (i.e. a source of sodium, potassium or ammonium and alkylated ammonium such as triethyl ammonium, and alkylated hydroxyl ammonium such as triethanol ammonium, and the like) to a pH of greater than about 1.8, or greater than about 2 or 3. The closer the pH to neutral (i.e., 7) the less corrosive the polymer solution will be. However, the greater the amount of neutralization the more likely it is for the itaconic acid to isomerize. Thus, the neutralizer is added in an amount suitable to achieve a pH of greater than 1.8 but less than the critical threshold at which itaconic acid will isomerize. Generally, the neutralizer can be added during the pre-neutralization step at a dosage to neutralize no more than 20 mole % of the carboxylic acid groups from the itaconic acid monomers. Preferably, the neutralizer can be added during the pre-neutralization step at a dosage to neutralize no more than 20 mole %, 15 mole %, or 10 mole % of the total carboxylic acid groups from all monomers, more preferably no more than 5 mole %. In some embodiments, the neutralizer can be added during the pre-neutralization step at a dosage to neutralize from about 0.01 to about 20 mole % of the carboxylic acid groups from all monomers, more preferably from about 0.1 to about 15 mole %, or from about 0.5 to about 10 mole %, or even 1 to about 5 mole % of the carboxylic acid groups from all monomers.

The process can also include a post-neutralization step in which the pH of the final product is neutralized with a neutralizer. Post-neutralization can make the polymer more alkaline so that it can be employed in high pH applications. An amount of up to about 120 mole % of the amount of neutralizer needed to completely neutralize the polymer may be added during post-neutralization, or up to about 100 mole %. In another embodiment, a neutralizer may be added at from about 60 to about 100 mole %, or from about 65 or 70 or 75 to about 85, or 90 or 95 mole %.

The neutralizer can be an alkali metal base, ammonium, and/or amine base. Alkali metal bases suitable for the neutralization include sodium hydroxide, potassium hydroxide and lithium hydroxide, while suitable ammonium and amine bases include ammonia, ammonium hydroxide, mono-, di- and trialkyl amines having 1 to 5 carbon atoms in each alkyl group, pyridine, morpholine and lutidine. The neutralizer can also be a base with carboxylic acid functionality, although it is preferred that such a neutralizer has less than 25 mole % carboxylic acid functionality. Examples of neutralizers having carboxylic acid functionality include, but are not limited to, amino acids, peptides, polypeptides, and their derivatives. The amino acid can be chosen from, for example, alanine, arginine, asparagine, aspartic acid, cysteine, glutamine, glutamic acid, glycine, isoleucine, leucine, lysine, methionine, phenylalanine, proline, serine, threonine, tryptophan, tyrosine, and valine.

Any water-soluble, free-radical initiator may be used as the polymerization initiator of this process. Suitable initiators include persulfates such as sodium and potassium persulfate as well as redox systems.

Other initiators, include peroxo- and/or azo-type initiators, such as hydrogen peroxide, benzoyl peroxide, acetyl peroxide, and lauryl peroxide, t-butyl peroxypivalate, t-butyl cumyl peroxide and/or cumene hydroperoxide, di-t-butyl peroxide and/or t-butyl hydroperoxide, ethyl hexyl peroxodicarbonate, diisopropyl peroxydicarbonate, 4-(t-butylperoxylperoxy-carbonyl)-3-hexyl-6-7-(t-butylperoxycarbonyl) hepty 1 cyclohexene (4-TBPCH), t-butyl peroxyneodecanoate, and other organic peroxides sold by Elf Atochem North America, Inc., Philadelphia, Pa., under the trade names of Lupersol, Luperco, Lucidol and Luperox; organic peracids, such as peracetic acid; and oil and water soluble free radical producing agents, such as azobis-dimethylvaleronitrile, 2,2'-azobisisobutyronitrile, azobis-methylbutyronitrile and others sold by DuPont, Wilmington, Del. under the trade name VAZO and by WAKO Pure Chemical Industries, Richmond, Va. under the trade name of V-40 to V501; and the like, and mixtures thereof can also be used in combination with water soluble initiators. Preferred oil soluble initiators are T-butyl peroxybenzoate, di-T-butyl peroxide, T-butyl cymyl peroxide, T-butyl peroxypivalate, lauryl peroxide, cumene hydroperoxide, ethyl hexyl peroxodicarbonate, diisopropyl peroxydicarbonate, 4-(t-butylperoxylperoxy-carbonyl)-3-hexyl-6-7-(t-butylperoxycarbonyl) hepty 1 cyclohexene, cumene hydroperoxide and t-butyl peroxyneodecanoate, t-butyl hydroperoxide, benzoyl, peroxide and combinations thereof.

Suitable reducers for the redox system include sulfur compounds, such as, for example, the sodium salt of hydroxymethanesulfinic acid, a mixture of a disodium salt of 2-hydroxy-2-sulfinatoacetic acid and sodium sulfite, Brüggolit™ FF6 and FF7 (registered trademarks of Brüggemann), sodium sulfite, sodium disulfite, sodium thiosulfate, and acetone-bisulfite adduct. A typical redox system can include, consist essentially of, or consist of, for example, sodium persulfate type oxidizers with sodium bisulfite type reducers, such as Brüggolit™ FF6. In one embodiment, the reaction mixture is free of metal promoters, such as copper and the like.

The polymerization initiator should be present in an amount of less than about 5 mole % based on the total amount of the monomers, such as from about 0.005 or 0.001 to about 1 or 5 mole %, or 0.01 to about 4.95 mole %, and even about 0.1 or 1 to about 4.9 mole % based on the total amount of the monomers. All or at least half of the initiator can be added separately from the itaconic acid monomer. In one embodiment, the initiator can be added essentially continuously throughout the polymerization period. The initiator can also be added in discreet amounts at various times through the polymerization period. Preferably, from about 0.5 to 25 or 50 wt % of the initiator charge is dissolved along with the itaconic acid in the aqueous medium and the remainder of the initiator (i.e., 50 or 75 to 99.5 wt %) is then introduced, preferably as an aqueous solution, over the polymerization period or with the (meth)acrylic acid or AMPS and other comonomers. The concentration of the initiator in the aqueous addition solution is normally from about 0.5 to 10 weight %.

The improved polymers can be prepared by reacting the co-monomers in the presence of additives, i.e., materials other than the co-monomers. In an embodiment, the additives included during the reaction of the co-monomers can include, for example, those derived from starches or a polyhydric alcohol or a polyvinyl alcohol. Suitable starches can include, for example, those derived from maize and conventional hybrids of maize, such as waxy maize and high amylose (greater than 40% amylose) maize, as well as other starches such as potato, tapioca, wheat, rice, pea, sago, oat, barley, rye, and amaranth, including conventional hybrids or genetically engineered materials. Polyhydric alcohols can include, for example, polyols containing from 1 to 24 carbons with more than one hydroxyl group, such as, for example, glycitol, 1,2,3-Propanetriol (glycerin), 1,2 propane diol, 1,2 butylene glycol, 1,3 butylene glycol, butane diol, erythritol, pentaerythritol, neopentyl glycol, threitol, xylitol, sorbitol, volemitol, maltitol, maltotriitol and maltotetraitol. Suitable polyvinyl alcohols are those of less than 100,000 number average molecular weight ("Mn"), or those less than 50,000 Mn, or even less than 10,000 Mn, such as 1000 to 10,000 Mn. The amount of starch or alcohol can be up to about up to 3 mol %, or up to 5 mol %, or up to 10 mol % or 20 mol % of the copolymer and/or terpolymer, such as from 0.001 to 10 or 20 mol %, or from about 0.01 to about 5 mol %, or even from about 0.1 or 1 to about 3 mol %.

A bleaching agent may be employed to improve the color of the polymer mixture. Bleaching agents can include, for example, hydrogen peroxide, its derivatives and addition products that release hydrogen peroxide.

The polymerization process may also include a peroxide clean-up agent to reduce and/or remove hydrogen peroxide residuals from any bleaching agent that might have been employed. Examples of peroxide clean-up agents can include peroxide clean-up enzymes and/or chemical reducing agents that remove hydrogen peroxide. Peroxide clean-up enzymes refer to enzymes which can catalyze the conversion of hydrogen peroxide into water and oxygen, such as catalase (EC 1.11.1.6). Example catalases include those derived from bacteria such as *Bacillus, Pseudomonas* or *Streptomyces* strain; yeast such as *Candida, Kluyveromyces, Pichia, Saccharomyces, Schizosaccharomyces* or *Yarrowia*; fungi such as *Acremonium, Aureobasidium, Aspergillus, Bjerkandera, Ceriporiopsis, Coprinus, Coriolus, Cryptococcus, Filibasidium, Fusarium, Humicola, Magnaporthe, Mucor, Myceliphthora, Neocallimastix, Neurospora, Paecilomyces, Penicillium, Phanerochaete, Phlebia, Piromyces, Pleurotus, Schizophyllum, Scytalidium, Talaromyces, Thermoascus, Thielavia, Tolypocladium, Trametes* or *Trichoderma* strain; or animals such as pig liver, beef lever. Non-limiting examples of suitable catalases are disclosed in WO 92/17571, CN 1563373, US 2003100112-A1, EP 1336659-A, US 2003/074697, U.S. Pat. Nos. 6,201,167, 6,022,721, EP 931831-A, JP 11046760-A, WO 93/17721, WO 93/09219, JP 1086879-A and/or JP 63003788-A. Non-limiting examples are T 100; Oxy-Gone 400 (GOD; Fermcolase 1000 (Mitsubishi Gas Chemical) or Thermocatalase CTL 200 or JH CT 1800 (Mitsubishi Gas Chemical). Depending on the activity of the catalase and the pH of the liquor used to apply the catalase, preferably the amount of catalase used is from 0.001 to 1 g/l, especially about 5 g/l of liquor used to apply the catalase. Chemical reducing system refers to any chemical reducing agent(s) for removing hydrogen peroxide by catalyzing the conversion of hydrogen peroxide into water and oxygen. Exemplary reducing agents include, for example, sodium thiosulphate, sodium bisulphite, sodium hydrosulphite and sodium hyposulphate, and the like.

Optionally, other polymerization additives and processing aids which are well known in the solution polymerization art, such as, chain transfer agents, solvents, emulsifiers, processing aids, defoamers, buffering agents, chelating agents, inorganic electrolytes, polymeric stabilizers, biocides, and pH adjusting agents can be included in the polymerization system.

The polymerization temperature and duration of the polymerization are influential in determining the nature of the resulting copolymer. The polymerization therefore may be limited to low temperatures of, for example, from about 50 to about 95° C., or from about 55 to about 90° C., or from about 60 to about 85° C., or even from about 60 to about 80° C. This low temperature polymerization may be completed in an aqueous medium of water, alcohol, or a combination thereof.

In an embodiment, the polymerization is carried out in water at a temperature of greater than about 60° C. In another embodiment, the polymerization is carried out in a water/alcohol (such as, for example, isopropyl alcohol) mixed solvent at a temperature of greater than about 40 or 50 or 60° C. In a further embodiment, the polymerization is carried out in water at a polymerization temperature of 99° C. or 90° C. or less. In a further embodiment, the polymerization is carried out in an alcohol (such as, for example, isopropyl alcohol) solvent at a temperature of greater than 50 or 55° C.

The presence of alcohol solvent can result in the partial esterification of the acid groups so that the resultant co-polymer comprises ester functionality. The percentage of acid groups in the co-polymer that become esterified may depend, in part, on the temperature and pressure at which the polymerization is maintained. The resultant polymer or co-polymer may be from about 0.1 to about 60 mole % esterified, meaning from about 0.1 to about 60% of the total acid groups from all monomers in the polymer/co-polymer are esterified. The polymer or co-polymer also may be from about 0.5, or 1 to about 50% esterified, or from 1.5, or 5, or 10 to about 40% esterified. In some embodiments, the polymer or co-polymer may be from about 0.1 to about 10 or 15% esterified. In some embodiments, the polymer/copolymer are essentially free or completely free of esterified acid groups.

The polymerization period can be sustained at from about 2 to about 8 hours. The final polymerization solution is generally maintained at the polymerization temperature until reaction is completed following the completion of the (meth) acrylic acid and/or AMPS co-monomers and initiator addition period.

By the selection of the above reaction parameters within the specified ranges, homogeneous or substantially homogeneous polymers, or random or block copolymers and/or terpolymers of itaconic acid, (meth)acrylic acid, AMPS, sodium styrene sulfonate, ester monomers, and/or allyl ether monomers can be prepared with number average molecular weights (Mn) of from about 500 to 100,000, preferably from about 1000 to 50,000, more preferably 1000 to 10,000. In some embodiments, the polymer composition can have an Mn of between about 100 or 150 and 500.

Importantly, the improved polymer, copolymers and/or terpolymers produced according to the above process will be free of or substantially free of moieties of tri-substituted vinyl monomer isomers of itaconic acid, such as citriconic acid and mesaconic acid. Further, the resulting polymer solution will include less than 0.5% w/w unreacted monomer based on the total weight of the polymer present in the solution, or less than 0.25% w/w, or free or substantially free of unreacted monomer.

In addition, the polymer solution will be transparent or substantially transparent. Transparency of a solution can be measured in terms of the turbidity of the solution; that is the cloudiness or haziness of the solution. Turbidity is measured on a nepholometer in nephelometric turbidity units ("NTU"). By transparent it is meant that the solution has a turbidity of less than 5 NTUs. Substantially transparent means the polymer solution has a turbidity of between about 5 and 100 NTUs, or more preferably 5 and 50 NTUs, 5 to 25 NTUs, or 5 to 15 NTUs.

Preferred embodiments of the instant process include those in which from about 30 to 40 mole % acrylic acid is copolymerized with from about 60 to 70 mole % itaconic acid. In an especially preferred process, about 30 to 40 mole % acrylic acid, 1 to 2 mole % sodium persulfate and 1 to 2 mole % Brüggolit™ FF6 are added separately over a period of about 3 to 5 hours to an aqueous solution of about 60 to 70 mole % itaconic acid at a temperature of between about 60° to 80° C., and the polymerization solution is held at temperature for an additional 4 hours following the addition.

The improved polymers can consist essentially of from about 30 to 40 mole % (meth)acrylic acid, AMPS, sodium styrene sulfonate, ester monomer, and/or allyl ether monomer derived units and from about 60 to 70 mole % itaconic acid derived units, or can consist essentially of from about 25 to 35 mole % (meth)acrylic acid or esters thereof, 5 to 15 mole % AMPS or sodium styrene sulfonate derived units or esters thereof and/or allyl ether monomers, and from about 50 to 60 mole % itaconic acid derived units or esters thereof, and having a number average molecular weight of from about 500 to 100,000, preferably from about 1000 to 50,000, more preferably 1000 to 10,000. The copolymer will normally be added to aqueous systems. The final polymerization solution, as such, diluted or concentrated as desired, will generally be used without isolation of the copolymer product.

Liquid polymers can also be dried using various drying techniques as known in the prior art [Handbook of Industrial Drying, by Arun S. Mujumdar, Third Edition, 2007]. Some commonly used polymer dryers are rotary dryer, flash dryer, spray dryer, fluidized bed dryer, vibrated fluidized bed dryer, contact fluid-bed dryer, paddle dryer, plate dryer, and DRT spiral dryer.

Evaluation of these improved polymers has shown them to be superior to the itaconic acid polymers of the prior art.

The improved polymers can therefore be employed in a method of chelating ions of hardness (e.g., chelating or sequestering metal ions and the like) from a solution. The method can comprise adding to a solution containing ions of hardness, or subject to containing ions of hardness, the improved polymers or solutions thereof. Many applications in the personal and home care industry are subjected to liquids that contain ions of hardness, for example, hard water. Thus, the improved polymers or solutions thereof can be employed as builders to improve detergent performance in, for example, household care products, water treatment products, automotive care, surface care, I&I and personal care products. Exemplary automotive care applications include, for example car washes, car protectants, car cleaners, car shampoos, and the like.

The polymers of the present invention can be used in home care, and institutional and industrial ("I&I") applications. Typical household and I&I products that may contain polymers of the invention, include, without being limited thereto, fabric care products, such as laundry detergents (powder, liquid, gel, and unit doses) and fabric softeners (liquids or sheets), ironing sprays, dry cleaning aids, anti-wrinkle sprays, stain and spot removers and the like; hard surface cleaners for the kitchen and bathroom and utilities and appliances employed or located therein, such as toilet bowl gels, tub and shower cleaners, hard water deposit removers, floor and tile cleaners, wall cleaners, floor and chrome fixture polishes, alkali-strippable vinyl floor cleaners, marble and ceramic cleaners, air freshener gels, liquid or powder cleaners for dishes (automatic and manual), and the like; disinfectant cleaners, such as toilet bowl and bidet cleaners, disinfectant hand soaps, room deodorizers, heavy duty hand soaps, cleaners and sanitizers, automotive cleaners and the like.

In a preferred embodiment, the improved polymers or solutions thereof are employed in automatic dish detergents. Such dish detergents can be in different forms, such as, for example, liquid, powder, gels, tablets and unit dose pouches, bars, paste, hard or soft compressed monolayered tablet, hard or soft compressed multilayered tablet, single phase unidose detergent, multiphase unidose comprising, for example, any combination of powder, granulate, liquid and gel phases. In another embodiment, the improved polymers can be used in laundry detergents both in liquid, powder, gels, tablets and unit dose pouches, bars, paste, hard or soft compressed monolayered tablet, hard or soft compressed multilayered tablet, single phase unidose detergent, multiphase unidose comprising, for example, any combination of powder, granulate, liquid and gel phases.

Exemplary water treatment applications include, for example, water purification processes for potable & industrial uses, cooling water treatment, boiler water treatment, desalination (e.g., reverse osmosis, distillation), wastewater (e.g., municipal & industrial) treatment, and the like. In one preferred embodiment, the improved polymers are used in water treatment applications as scale inhibitors and/or dispersants.

Exemplary deposit control applications, both scale and suspended solid dispersion, as applied to water treatment including fresh, saline, and process water, include, for example, cooling water treatment, boiler water treatment, thermal and reverse osmosis (RO) desalination, municipal and industrial wastewater, geothermal exploration, oil and gas exploration and production, pulp and paper, sugar refining, as well as mining processes. Scale examples include calcium carbonate; calcium phosphates and phosphonates; calcium, barium, and strontium sulfates; magnesium hydroxide; calcium fluoride; calcium oxalates; silica; and silicates. In some cases, the improved polymers can be used as scale removing agents, rheology modifiers in drilling operations as well as for slurry transport of solids suspended in water.

Exemplary personal care cleansers include but are not limited to shampoos (e.g., 2-in-1 shampoos, conditioning shampoos, bodifying shampoos; moisturizing shampoos, temporary hair color shampoos, 3-in-1 shampoos, anti-dandruff shampoos, hair color maintenance shampoos, acid (neutralizing) shampoos, salicylic acid shampoos, medicated shampoos, baby shampoos, and the like), and skin and body cleansers (e.g., moisturizing body washes, antibacterial body washes; bath gels, shower gels, liquid hand soaps, bar soaps, body scrubs, bubble baths, facial scrubs, foot scrubs, and the like). Similarly, the improved polymer can be employed in pet and animal care applications. Exemplary pet and animal care cleansers include but are not limited to shampoos, medicated shampoos, conditioning shampoos (e.g., detangling, antistatic, grooming), and foaming shampoos.

There is no limitation as to the form of product in which the improved polymers can be incorporated, so long as the purpose for which the product is used is achieved. For example, personal care and health care products containing the improved polymer can be applied to the skin, hair, scalp and nails in the form of, without being limited thereto, gels, sprays (liquid or foam), emulsions (creams, lotions, pastes), liquids (rinses, shampoos), bars, ointments, suppositories, impregnated wipes, patches, and the like. Likewise, while the improved polymers can be employed on their own, the improved polymers can be employed in compositions with optional additional ingredients.

It is known that formulated compositions for personal care and topical, dermatological, health care, which are applied to the skin and mucous membranes for cleansing or soothing, are compounded with many of the same or similar physiologically tolerable ingredients and formulated in the same or similar product forms, differing primarily in the purity grade of ingredient selected, by the presence of medicaments or pharmaceutically accepted compounds, and by the controlled conditions under which products may be manufactured. Likewise, many of the ingredients employed in products for households, and I&I are the same or similar to the foregoing, differing primarily in the amounts and material grade employed. It is also known that the selection and permitted amount of ingredients also may be subject to governmental regulations, on a national, regional, local, and international level. Thus, discussion herein of various useful ingredients listed below may apply to personal care, health care products, household and I&I products and industrial applications.

The choice and amount of ingredients in formulated compositions containing an improved polymer as described herein will vary depending on the product and its function, as is well known to those skilled in the formulation arts. Formulation ingredients typically can include, but are not limited to, dye transfer inhibitors, soil release agents, glass and ceramic corrosion inhibitors, plastic care ingredients, natural and synthetic soaps, solvents, surfactants (as cleaning agents, emulsifying agents, foam boosters, hydrotropes, solubilizing agents, and suspending agents), non-surfactant suspending agents, anti-redeposition aids, brighteners, fillers (e.g., sodium carbonate, sodium sulfate, sodium silicate and the like), deflocculating agents, enzymes and enzyme stabilizing agents, radical scavengers, corrosion inhibitors, salts, emulsifiers, conditioning agents (emollients, humectants, moisturizers, and the like), fixatives, film-formers, protectants, binders, builders, chelating agents, chelators, co-chelators, antimicrobial agents, antifungal agents, antidandruff agents, abrasives, adhesives, absorbents, dyes, deodorant agents, antiperspirant agents, opacifying and pearlescing agents, antioxidants, preservatives, propellants, spreading aids, sunscreen agents, sunless skin tanning accelerators, ultraviolet light absorbers, pH adjusting agents, botanicals, hair colorants, oxidizing agents, reducing agents, bleaching agents, pigments, physiologically active agents, anti-inflammatory agents, topical anesthetics, bactericides, fragrance and fragrance solubilizers, and the like, in addition to ingredients previously discussed that may not appear herein. An extensive listing of substances and their conventional functions and product categories appears in the INCI Dictionary, generally, and in Vol. 2, Sections 4 and 5 of the Seventh Edition, in particular, incorporated herein by reference.

Any cleaning ingredient in addition to builders can be used as part of the detergent product of the invention. The levels given are weight percent and refer to the total composition (excluding the enveloping water-soluble material, in the case of unit close forms having a wrapper or enveloping material). The detergent composition can contain a phosphate builder or be free of phosphate builder and comprise one or more detergent active components which may be selected from bleach, bleach activator, bleach catalyst, surfactants, alkalinity sources, polymer, dying aids, anti-corrosion agents (e.g. sodium silicate) and care agents. Particularly suitable cleaning components for use herein include a builder compound, a bleach, an alkalinity source, a surfactant, an anti-scaling polymer for example, a polymer, an enzyme and an additional bleaching agent.

Surfactant

Surfactants are generally employed as cleaning and cleansing agents, emulsifying agents, foam boosters, hydrotropes and rheology modifying systems. The polymers of the present invention may be employed in formulations containing all classes of surfactants, i.e., anionic surfactants, cationic surfactants, nonionic surfactants, amphoteric surfactants. The term "amphoteric surfactant" as used herein includes zwitterionic surfactants. In addition to the foregoing references, discussions of the classes of surfactants are in Cosmetics Toiletries™ C&T Ingredient Resource Series, "Surfactant Encyclopedia", 2nd Edition, Rieger (ed), Allured Publishing Corporation (1996); Schwartz, et al., Surface Active Agents, Their Chemistry and Technology, published 1949; and Surface Active Agents and Detergents, Volume II, published 1958, Interscience Publishers; each incorporated herein by reference.

Anionic Surfactant Detergents

Anionic surface active agents which may be used in the present invention are those surface active compounds which contain a long chain hydrocarbon hydrophobic group in their molecular structure and a hydrophilic group, i.e. water solubilizing group such as carboxylate, sulfonate or sulfate group or their corresponding acid form. The anionic surface active agents include the alkali metal (e.g. sodium and potassium) and nitrogen based bases (e.g. mono-amines and polyamines) salts of water soluble higher alkyl aryl sulfonates, alkyl sulfonates, alkyl sulfates and the alkyl poly ether sulfates. They may also include fatty acid or fatty acid soaps. One of the preferred groups of mono-anionic surface active agents are the alkali metal, ammonium or alkanolamine salts of higher alkyl aryl sulfonates and alkali metal, ammonium or alkanolamine salts of higher alkyl sulfates or the mono-anionic polyamine salts. Preferred higher alkyl sulfates are those in which the alkyl groups contain 8 to 26 carbon atoms, preferably 12 to 22 carbon atoms and more preferably 14 to 18 carbon atoms. The alkyl group in the alkyl aryl sulfonate preferably contains 8 to 16 carbon atoms and more preferably 10 to 15 carbon atoms. A particularly preferred alkyl aryl sulfonate is the sodium, potassium or ethanolamine $C_{10}$ to $C_{16}$ benzene sulfonate, e.g. sodium linear dodecyl benzene sulfonate. The primary and secondary alkyl sulfates can be made by reacting long chain olefins with sulfites or bisulfites, e.g. sodium bisulfite.

The alkyl sulfonates can also be made by reacting long chain normal paraffin hydrocarbons with sulfur dioxide and oxygen as describe in U.S. Pat. Nos. 2,503,280, 2,507,088, 3,372,188 and 3,260,741 to obtain normal or secondary higher alkyl sulfates suitable for use as surfactant detergents.

The alkyl substituent is preferably linear, i.e. normal alkyl, however, branched chain alkyl sulfonates can be employed, although they are not as good with respect to biodegradability. The alkane, i.e. alkyl, substituent may be terminally sulfonated or may be joined, for example, to the 2-carbon atom of the chain, i.e. may be a secondary sulfonate. It is understood in the art that the substituent may be joined to any carbon on the alkyl chain. The higher alkyl sulfonates can be used as the alkali metal salts, such as sodium and potassium. The preferred salts are the sodium salts. The preferred alkyl sulfonates are the $C_{10}$ to $C_{18}$ primary normal alkyl sodium and potassium sulfonates, with the $C_{10}$ to $C_{15}$ primary normal alkyl sulfonate salt being more preferred.

Mixtures of higher alkyl benzene sulfonates and higher alkyl sulfates can be used as well as mixtures of higher alkyl benzene sulfonates and higher alkyl polyether sulfates.

The alkali metal or ethanolamine sulfate can be used in admixture with the alkylbenzene sulfonate in an amount of 0 to 70%, preferably 5 to 50% by weight.

The higher alkyl polyethoxy sulfates used in accordance with the present invention can be normal or branched chain alkyl and contain lower alkoxy groups which can contain two or three carbon atoms. The normal higher alkyl polyether sulfates are preferred in that they have a higher degree of biodegradability than the branched chain alkyl and the lower poly alkoxy groups are preferably ethoxy groups.

The preferred higher alkyl polyethoxy sulfates used in accordance with the present invention are represented by the formula:

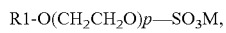

R1-O(CH$_2$CH$_2$O)$p$—SO$_3$M, where R1 is $C_8$ to $C_{20}$ alkyl, preferably $C_{10}$ to $C_{18}$ and more preferably $C_{12}$ to $C_{15}$; p is 1 to 8, preferably 2 to 6, and more preferably 2 to 4; and M is an alkali metal, such as sodium and potassium, an ammonium cation or polyamine. The sodium and potassium salts, and polyamines are preferred.

A preferred higher alkyl poly ethoxylated sulfate is the sodium salt of a triethoxy $C_{12}$ to $C_{15}$ alcohol sulfate having the formula:

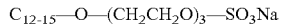

$C_{12\text{-}15}$—O—(CH$_2$CH$_2$O)$_3$—SO$_3$Na

Examples of suitable alkyl ethoxy sulfates that can be used in accordance with the present invention are $C_{12\text{-}15}$ normal or primary alkyl triethoxy sulfate, sodium salt; n-decyl diethoxy sulfate, sodium salt; $C_{12}$ primary alkyl diethoxy sulfate, ammonium salt; $C_{12}$ primary alkyl triethoxy sulfate, sodium salt; $C_{15}$ primary alkyl tetraethoxy sulfate, sodium salt; mixed $C_{14\text{-}15}$ normal primary alkyl mixed tri- and tetraethoxy sulfate, sodium salt; stearyl pentaethoxy sulfate, sodium salt; and mixed $C_{10\text{-}18}$ normal primary alkyl triethoxy sulfate, potassium salt.

The normal alkyl ethoxy sulfates are readily biodegradable and are preferred. The alkyl poly-lower alkoxy sulfates can be used in mixtures with each other and/or in mixtures with the above discussed higher alkyl benzene, sulfonates, or alkyl sulfates.

The alkali metal higher alkyl poly ethoxy sulfate can be used with the alkyl benzene sulfonate and/or with an alkyl sulfate, in an amount of 0 to 70%, preferably 5 to 50% and more preferably 5 to 20% by weight of entire composition.

Nonionic Surfactant

Nonionic surfactants which can be used with the invention, alone or in combination with other surfactants are described below.

As is well known, the nonionic surfactants are characterized by the presence of a hydrophobic group and an organic hydrophilic group and are typically produced by the condensation of an organic aliphatic or alkyl aromatic hydrophobic compound with ethylene oxide (hydrophilic in nature). Typical suitable nonionic surfactants are those disclosed in U.S. Pat. Nos. 4,316,812 and 3,630,929.

Usually, the nonionic surfactants are polyalkoxylated lipophiles wherein the desired hydrophile-lipophile balance is obtained from addition of a hydrophilic poly-alkoxy group to a lipophilic moiety. A preferred class of nonionic detergent is the alkoxylated alkanols wherein the alkanol is of 9 to 20 carbon atoms and wherein the number of moles of alkylene oxide (of 2 or 3 carbon atoms) is from 3 to 20. Of such materials it is preferred to employ those wherein the alkanol is a fatty alcohol of 9 to 11 or 12 to 15 carbon atoms and which contain from 5 to 9 or 5 to 12 alkoxy groups per mole. Also preferred is paraffin-based alcohol (e.g. nonionics from Huntsman or Sassol).

Exemplary of such compounds are those wherein the alkanol is of 10 to 15 carbon atoms and which contain about 5 to 12 ethylene oxide groups per mole, e.g. Neodol® 25-9 and Neodol® 23-6.5, which products are made by Shell Chemical Company, Inc. The former is a condensation product of a mixture of higher fatty alcohols averaging about 12 to 15 carbon atoms, with about 9 moles of ethylene oxide and the latter is a corresponding mixture wherein the carbon atoms content of the higher fatty alcohol is 12 to 13 and the number of ethylene oxide groups present averages about 6.5. The higher alcohols are primary alkanols.

Another subclass of alkoxylated surfactants which can be used contain a precise alkyl chain length rather than an alkyl chain distribution of the alkoxylated surfactants described above. Typically, these are referred to as narrow range alkoxylates. Examples of these include the Neodol-1® series of surfactants manufactured by Shell Chemical Company.

Other useful nonionics are represented by the commercially well known class of nonionics sold under the trademark Plurafac® by BASF. The Plurafacs® are the reaction products of a higher linear alcohol and a mixture of ethylene and propylene oxides, containing a mixed chain of ethylene oxide and propylene oxide, terminated by a hydroxyl group. Examples include $C_{13}$-$C_{15}$ fatty alcohol condensed with 6 moles ethylene oxide and 3 moles propylene oxide, $C_{13}$-$C_{15}$ fatty alcohol condensed with 7 moles propylene oxide and 4 moles ethylene oxide, $C_{13}$-$C_{15}$ fatty alcohol condensed with 5 moles propylene oxide and 10 moles ethylene oxide or mixtures of any of the above.

Another group of liquid nonionics are commercially available from Shell Chemical Company, Inc. under the Dobanol® or Neodol® trademark: Dobanol® 91-5 is an ethoxylated $C_9$-$C_{11}$ fatty alcohol with an average of 5 moles ethylene oxide and Dobanol® 25-7 is an ethoxylated $C_{12}$-$C_{15}$ fatty alcohol with an average of 7 moles ethylene oxide per mole of fatty alcohol.

In the compositions of this invention, preferred nonionic surfactants include the $C_{12}$-$C_{15}$ primary fatty alcohols with relatively narrow contents of ethylene oxide in the range of from about 6 to 9 moles, and the $C_9$ to $C_{11}$ fatty alcohols ethoxylated with about 5-6 moles ethylene oxide.

Another class of nonionic surfactants which can be used in accordance with this invention are glycoside surfactants.

Glycoside surfactants suitable for use in accordance with the present invention include those of the formula:

RO—(R$_2$O)$y$—(Z)$x$ wherein R is a monovalent organic radical containing from about 6 to about 30 (preferably from about 8 to about 18) carbon atoms; R$_2$ is a divalent hydrocarbon radical containing from about 2 to 4 carbons atoms; O is an oxygen atom; y is a number which can have an average value of from 0 to about 12 but which is most preferably zero; Z is a moiety derived from a reducing saccharide containing 5 or 6 carbon atoms; and x is a number having an average value of from 1 to about 10 (preferably from about 1½ to about 10).

A particularly preferred group of glycoside surfactants for use in the practice of this invention includes those of the formula above in which R is a monovalent organic radical (linear or branched) containing from about 6 to about 18 (especially from about 8 to about 18) carbon atoms; y is zero; z is glucose or a moiety derived therefrom; x is a number having an average value of from 1 to about 4 (preferably from about 1½ to 4). Nonionic surfactants which may be used include polyhydroxy amides as discussed in U.S. Pat. No. 5,312,954 to Letton et al. and aldobionamides such as disclosed in U.S. Pat. No. 5,389,279 to Au et al.

Generally, nonionics would comprise 0-75% by wt., preferably 5 to 50%, more preferably 5 to 25% by wt. of the composition. Mixtures of two or more of the nonionic surfactants can be used.

Surfactants suitable for use herein include non-ionic surfactants. Traditionally, non-ionic surfactants have been used in detergent compositions for surface modification purposes in particular for sheeting to avoid filming and spotting and to improve shine. It has been found that non-ionic surfactants can also contribute to prevent redeposition of soils.

In one aspect, the detergent product of the invention comprises is a non-ionic surfactant or a non-ionic surfactant system, in one aspect, the non-ionic surfactant or a non-ionic surfactant system has a phase inversion temperature, as measured at a concentration of 1% in distilled water, between 40° C. and 70° C., preferably between 45° C. and 65° C. A "non-ionic surfactant system" means a mixture of two or more non-ionic surfactants. Non-ionic surfactant systems are typically especially useful as they seem to have improved cleaning and finishing properties and better stability in product than single non-ionic surfactants.

Phase inversion temperature is the temperature below which a surfactant, or a mixture thereof, partitions preferentially into the water phase as oil-swollen micelles and above which it partitions preferentially into the oil phase as water swollen inverted micelles. Phase inversion temperature can be determined visually by identifying at which temperature cloudiness occurs.

The phase inversion temperature of a non-ionic surfactant or system can be determined as follows: a solution containing 1% of the corresponding surfactant or mixture by weight of the solution in distilled water is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

Suitable nonionic surfactants include: i) ethoxylated non-ionic surfactants prepared by the reaction of a monohydroxy alkanol or alkyphenol with 6 to 20 carbon atoms typically with at least 12 moles, at least 16 moles, or even at least 20 moles of ethylene oxide per mole of alcohol or alkylphenol; ii) alcohol alkoxylated surfactants having a from 6 to 20 carbon atoms and at least one ethoxy and propoxy group. In one aspect, mixtures of surfactants i) and ii) are particularly useful.

Another class of suitable non-ionic surfactants are epoxy-capped poly(oxyalkylated) alcohols represented by the formula: $R^1O[CH_2CH(CH_3)O]_x[CH_2CH_2O]_y[CH_2CH(OH)R^2]$ (I) wherein $R^1$ is a linear or branched, aliphatic hydrocarbon radical having from 4 to 18 carbon atoms; $R^2$ is a linear or branched aliphatic hydrocarbon radical having from 2 to 26 carbon atoms; x is an integer having an average value of from 0.5 to 1.5, or about 1; and y is an integer having a value of at least 15, or at least 20. In one aspect, the surfactant of formula I, at least about 10 carbon atoms in the terminal epoxide unit $[CH_2CH(OH)R^2]$. Suitable surfactants of formula I, according to the present invention, include Olin Corporation's POLY-TERGENT® SLF-18B nonionic surfactants, as described, for example, in U.S. Pat. Nos. 5,766, 371 and 5,576,281. Suitable non-ionic surfactants and/or system to use as anti-redeposition agents herein may have a Draves wetting time of less than 360 seconds, less than 200 seconds, less than 100 seconds or less than 60 seconds as measured by the Draves wetting method (standard method ISO 8022 using the following conditions; 3-g hook, 5-g cotton skein, 0.1% by weight aqueous solution at a temperature of 25° C.).

Low-Foaming Nonionic Surfactant

Detergent compositions of the present application comprise low foaming nonionic surfactants (LFNIs). LFNI can be present in amounts from about 0.1% to about 2%. LFNIs are most typically used in detergents on account of the improved water-sheeting action (especially from glass) which they confer to the detergents.

Preferred LFNIs include nonionic alkoxylated surfactants, especially ethoxylates derived from primary alcohols, and blends thereof with more sophisticated surfactants, such as the polyoxypropylene/polyoxyethylene/polyoxypropylene (PO/EO/PO) reverse block polymers. The PO/EO/PO polymer-type surfactants are well-known to have foam suppressing or defoaming action, especially in relation to common food soil ingredients such as egg.

In a preferred embodiment, the LFNI is an ethoxylated surfactant derived from the reaction of a monohydroxy alcohol or alkylphenol containing from about 8 to about 20 carbon atoms, excluding cyclic carbon atoms, with from about 6 to about 15 moles of ethylene oxide per mole of alcohol or alkyl phenol on an average basis.

The improved polymers of the present invention are particularly useful for water-based formulations, water-free formulations, powders, and formulations containing water-miscible auxiliary solvents, but are not limited thereto. Useful solvents commonly employed are typically liquids, such as water (deionized, distilled or purified), alcohols, polyols, and the like, and mixtures thereof. Non-aqueous or hydrophobic auxiliary solvents are commonly employed in substantially water-free products, such as aerosol propellant sprays, automotive and household surface cleaners, or for specific functions, such as removal of oily soils, sebum, stain, or for dissolving dyes, fragrances, and the like, or are incorporated in the oily phase of an emulsion. Non-limiting examples of auxiliary solvents, other than water, include linear and branched alcohols, such as ethanol, propanol, isopropanol, hexanol, and the like; aromatic alcohols, such as benzyl alcohol, cyclohexanol, and the like; saturated $C_{12}$-$C_{30}$ fatty alcohol, such as lauryl alcohol, myristyl alcohol, cetyl alcohol, stearyl alcohol, behenyl alcohol, and the like. Non-limiting examples of polyols include polyhydroxy alcohols, such as glycerin, propylene glycol, butylene glycol, hexylene glycol, $C_2$-$C_4$ alkoxylated alcohols and $C_2$-$C_4$ alkoxylated polyols, such as ethoxylated, propoxylated, and butoxylated ethers of alcohols, diols, and polyols having about 2 to about 30 carbon atoms and 1 to about 40 alkoxy units, polypropylene glycol, polybutylene glycol, and the like. Non-limiting examples of non-aqueous auxiliary solvents include silicones, and silicone derivatives, such as cyclomethicone, and the like, ketones such as acetone and methylethyl ketone; natural and synthetic oils and waxes, such as vegetable oils, plant oils, animal oils, essential oils, mineral oils, $C_7$-$C_{40}$ isoparaffins, alkyl carboxylic esters, such as ethyl acetate, amyl acetate, ethyl lactate, and the like, jojoba oil, shark liver oil, and the like. Some of the foregoing non-aqueous auxiliary solvents may also be diluents, solubilizers, conditioners and emulsifiers.

A particularly preferred LFNI is derived from a straight chain fatty alcohol containing from about 16 to about 20 carbon atoms ($C_{16}$-$C_{20}$ alcohol), preferably a $C_{18}$ alcohol, condensed with an average of from about 6 to about 15 moles, preferably from about 7 to about 12 moles, and most preferably from about 7 to about 9 moles of ethylene oxide per mole of alcohol. Preferably the ethoxylated nonionic surfactant so derived has a narrow ethoxylate distribution relative to the average.

The LFNI can optionally contain propylene oxide in an amount up to about 15% by weight. Certain of the block polymer surfactant compounds designated PLURONIC® and TETRONIC® by the BASF-Wyandotte Corp., Wyandotte, Mich., are suitable in gel automatic detergents of the invention. Highly preferred gel automatic detergents herein wherein the LFNI is present make use of ethoxylated monohydroxy alcohol or alkyl phenol and additionally comprise a polyoxyethylene, polyoxypropylene block polymeric compound; the ethoxylated monohydroxy alcohol or alkyl phenol fraction of the LFNI comprising from about 20% to about 80%, preferably from about 30% to about 70%, of the total LFNI.

LFNIs which may also be used include a $C_{18}$ alcohol polyethoxylate, having a degree of ethoxylation of about 8, commercially available SLF18 from Olin Corp.

Formulations may comprise low-foam nonionic surfactants. Paraffin oils and silicone oils may, if appropriate, be used as defoamers and to protect plastics and metal surfaces. Defoamers are used generally in proportions of from 0.001% by weight to 20% by weight, preferably from 0.1 to 15% by weight and more preferably from 0.25 to 10% by weight.

Cationic Surfactants

Many cationic surfactants are known in the art, and almost any cationic surfactant having at least one long chain alkyl group of about 10 to 24 carbon atoms is suitable in the present invention. Such compounds are described in "Cationic Surfactants", Jungermann, 1970.

Specific cationic surfactants which can be used as surfactants in the subject invention are described in detail in U.S. Pat. No. 4,497,718.

As with the nonionic and anionic surfactants, the compositions of the invention may use cationic surfactants alone or in combination with any of the other surfactants known in the art. Of course, the compositions may contain no cationic surfactants at all.

Amphoteric Surfactants

Ampholytic synthetic surfactants can be broadly described as derivatives of aliphatic or aliphatic derivatives of heterocyclic secondary and tertiary amines in which the aliphatic radical may be straight chain or branched and wherein one of the aliphatic substituents contains from about 8 to 18 carbon atoms and at least one contains an anionic water-soluble group, e.g. carboxylate, sulfonate, sulfate. Examples of compounds falling within this definition are sodium 3-(dodecylamino)propionate, sodium 3-(dodecylamino) propane-1-sulfonate, sodium 2-(dodecylamino) ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis (2-hydroxyethyl)-2-sulfato-3-dodecoxypropylamine.

Sodium 3-(dodecylamino) propane-1-sulfonate is preferred.

Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. The cationic atom in the quaternary compound can be part of a heterocyclic ring. In all of these compounds there is at least one aliphatic group, straight chain or branched, containing from about 3 to 18 carbon atoms and at least one aliphatic substituent containing an anionic water-solubilizing group, e.g., carboxy, sulfonate, sulfate, phosphate, or phosphonate.

Specific examples of zwitterionic surfactants which may be used are set forth in U.S. Pat. No. 4,062,647.

The amount of additional surfactant used may vary from 1 to 85% by weight, preferably 10 to 50% by weight.

As noted the preferred surfactant systems of the invention are mixtures of anionic and nonionic surfactants.

Preferably, the nonionic should comprise, as a percentage of an anionic/nonionic system, at least 20%, more preferably at least 25%, up to about 75% of the total surfactant system.

Amine Oxide

Amine oxides surfactants are also useful inn the present invention and include linear and branched compounds having the formula: O"I $R^3(OR^4)xN^+(R^5)_2$ wherein $R^3$ is selected from an alkyl, hydroxyalkyl, acylamidopropoyl and alkyl phenyl group, or mixtures thereof, containing from 8 to 26 carbon atoms, or 8 to 18 carbon atoms; $R^4$ is an alkylene or hydroxyalkylene group containing from 2 to 3 carbon atoms, or 2 carbon atoms, or mixtures thereof; x is from 0 to 5, or from 0 to 3; and each $R^5$ is an alkyl or hydroxyalkyl group containing from 1 to 3, or from 1 to 2 carbon atoms, or a polyethylene oxide group containing from 1 to 3, or even 1, ethylene oxide group. The $R^5$ groups can be attached to each other, e.g., through an oxygen or nitrogen atom, to form a ring structure.

These amine oxide surfactants in particular include $C_{10}$-$C_{18}$ alkyl dimethyl amine oxides and $C_8$-$C_{14}$ alkoxy ethyl dihydroxyethyl amine oxides. Examples of such materials include dimethyloctylamine oxide, diethyldecylamine oxide, bis-(2-hydroxyethyl)dodecylamine oxide, dimethyldodecylamine oxide, dipropyltetradecylamine oxide, methylethylhexadecylamine oxide, dodecylamidopropyl dimethylamine oxide, cetyl dimethylamine oxide, stearyl dimethylamine oxide, tallow dimethylamine oxide and dimethyl-2-hydroxyoctadecylamine oxide. In one aspect, $C_{10}$-$C_{18}$ alkyl dimethylamine oxide, and $C_{10}$-$C_{18}$ acylamido alkyl dimethylamine oxide are employed.

Enzymes

As used herein, enzymes means any enzyme having a cleaning, stain removing or otherwise beneficial effect in a detergent composition. Preferred enzymes are hydrolases such as proteases, amylases and lipases. Highly preferred for dishwashing are amylases and/or proteases, including both current commercially available types and improved types. Enzymes are normally incorporated in the instant detergent compositions at levels sufficient to provide a "cleaning-effective amount". The term "cleaning-effective amount" refers to any amount capable of producing a cleaning, stain removal or soil removal effect on substrates such tableware.

The compositions herein can comprise: from about 0.001% to about 20%, preferably from about 0.005% to about 10%, most preferably from about 0.01% to about 6%, by weight of an enzyme stabilizing system.

Proteases

In the automatic dishwashing detergent composition of the invention a mixture of two or more proteases may be used. A mixture of proteases can contribute to an enhanced cleaning across a broader temperature and/or substrate range and provide superior shine benefits, especially when used in conjunction with the improved polymer.

Suitable proteases for use in combination with the variant protease of the invention include metalloproteases and serine proteases, including neutral or alkaline microbial serine proteases, such as subtilisins (EC 3.4.21.62). Suitable proteases include those of animal, vegetable or microbial origin. Microbial origin is preferred. Chemically or genetically modified mutants are included. The protease may be a serine protease, in one aspect, an alkaline microbial protease or a chymotrypsin or trypsin-like protease. Examples of neutral or alkaline proteases include:

(a) subtilisins (EC 3.4.21.62), especially those derived from *Bacillus*, such as *Bacillus lentus, B. alkalophilus, B. subtilis, B. amyloliquefaciens, Bacillus pumilus* and *Bacillus gibsonii* described in U.S. Pat. No. 6,312,936 B 1, U.S. Pat. Nos. 5,679,630, 4,760,025, and USPA 2009/0170745A1.

(b) trypsin-like or chymotrypsin-like proteases, such as trypsin (e.g., of porcine or bovine origin), the *Fusarium* protease described in U.S. Pat. No. 5,288,627 and the chymotrypsin proteases derived from *Cellumonas* described in USPA 2008/0063774A1.

(c) metalloproteases, especially those derived from *Bacillus amyloliquefaciens* described in USPA 2009/0263882 A 1 and USPA 2008/0293610A1. Suitable commercially available protease enzymes include those sold under the trade names Alcalase®, Savinase®, Primase®, Durazym®, Polarzyme®, Kannase®, Liquanase®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International (now Danisco US Inc.), and those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101 R+S 103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao. In one aspect, commercial proteases selected from the group consisting of Properase®, Purafect®, Ovozyme®, Everlase®, Savinase®, Excellase® and FN3® are employed.

Amylases

Amylase enzymes are additional enzymes that are useful in detergent compositions. Suitable amylases include those described in USPA 2009/0233831 A1 and USPA 2009/0314286A1. Suitable commercially available amylases for use herein include STAINZYME®, STAINZYME PLUS®, STAINZYME ULTRA® and NATALASE® (Novozymes A/S) and Spezyme Xtra™ and Powerase™. STAINZYME PLUS® and Powerase™ may be particularly useful.

Cellulases

In one aspect, the detergent composition of the invention comprises a cellulase enzyme. This composition provides excellent results in terms of not only cleaning of the fabric, dishware/tableware but also in terms of cleaning of the machines such as, dishwasher.

Cellulase enzymes include microbial-derived endoglucanases exhibiting endo-beta-1,4-glucanase activity (EC. 3.2.1.4), including a bacterial polypeptide endogenous to a member of the genus *Bacillus* which has a sequence of at least 90%, 94%, 97% and even 99% identity to the amino acid sequence SEQ ID NO:2 in U.S. Pat. No. 7,141,403B2) and mixtures thereof. Suitable commercially available cellulases for use herein include Celluzyme®, Celluclean®, Whitezyme® (Novozymes A/S) and Puradax HA® (Genencor International—now Danisco US Inc.).

Other Additional Enzymes

Other additional enzymes suitable for use in the detergent composition of the invention can comprise one or more enzymes selected from the group comprising hemicellulases, cellobiose dehydrogenases, peroxidases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and mixtures thereof.

In one aspect, such additional enzyme may be selected from the group consisting of lipases, including "first cycle lipases" comprising a substitution of an electrically neutral or negatively charged amino acid with R or K at any of positions 3, 224, 229, 231 and 233 on the wild-type of *Humicola Lanuginosa*, whose sequence is shown as SEQ ID No 1 in pages 5 and 6 of U.S. Pat. No. 6,939,702 B1, in one aspect, a variant comprising T231R and N233R mutations. One such variant is sold under the tradename Lipex® (Novozymes A/S, Bagsvaerd, Denmark).

Enzyme Stabilizer Components

Suitable enzyme stabilizers include oligosaccharides, polysaccharides and inorganic divalent metal salts, such as alkaline earth metal salts, especially calcium salts. Chlorides and sulphates are may be particularly suitable with calcium chloride, in one aspect, being an especially suitable calcium salt. Examples of suitable oligosaccharides and polysaccharides, such as dextrins, can be found in USPA 2008/0004201 A1. In case of aqueous compositions comprising protease, a reversible protease inhibitor, such as a boron compound, including borate and 4-formyl phenyl boronic acid or a tripeptide aldehyde, can be added to further improve stability.

The purpose of an enzyme stabilizing system is to protect the enzymes in the composition between the time the composition is manufactured and the time the composition is use. It is preferred that the enzyme activity remains between about 60% and 100%, more preferably between about 70% and 100%, more preferably about 80% and 100%. In one embodiment, the stabilized enzyme is a protease and the enzyme activity is of such protease.

The enzyme stabilizing system can be any stabilizing system which can be compatible with the detersive enzyme and with the xanthan gum thickener—thereby excluding boric acid, borax (sodium tetraborate decahydrate) and alkali metal borates. Such stabilizing systems can comprise calcium ion, glycerin, propylene glycol, short chain carboxylic acid and mixtures thereof.

Bleach

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated. Alkali metal percarbonates, particularly sodium percarbonate are preferred perhydrates for use herein. The percarbonate is most preferably incorporated into the products in a coated form which provides in-product stability. A suitable coating material providing in product stability comprises mixed salt of a water-soluble alkali metal sulphate and carbonate. Such coatings together with coating processes have previously been described in U.S. Pat. No. 4,105,827. The weight ratio of the mixed salt coating material to percarbonate lies in the range from 1:200 to 1:4, from 1:99 to 1:9, or from 1:49 to 1:19. In one aspect, the mixed salt is of sodium sulphate and sodium carbonate which has the general formula $Na_2SO_4.n.Na_2CO_3$ wherein n is from 0.1 to 3, from 0.2 to 1.0 or from 0.2 to 0.5. Another suitable coating material providing in product stability, comprises sodium silicate of $SiO_2:Na_2O$ ratio from 1.8:1 to 3.0:1, or 1.8:1 to 2.4:1, and/or sodium metasilicate, in one aspect, applied at a level of from 2% to 10%, (normally from 3% to 5%) of $SiO_2$ by weight of the inorganic perhydrate salt. Magnesium silicate can also be included in the coating. Coatings that contain silicate and borate salts or boric acids or other inorganics are also suitable.

Other coatings which contain waxes, oils, fatty soaps can also be used advantageously within the present invention.

Potassium peroxymonopersulfate is another inorganic perhydrate salt of utility herein.

Typical organic bleaches are organic peroxy acids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. Mono- and diperazelaic acid, mono- and diperbrassylic acid, and Nphthaloylaminoperoxicaproic acid are also suitable herein.

The diacyl peroxide, especially dibenzoyl peroxide, should typically be present in the form of particles having a weight average diameter of from about 0.1 to about 100 microns, from about 0.5 to about 30 microns, or from about 1 to about 10 microns. In one aspect, at least about 25%, at least about 50%, at least about 75%, or at least about 90%, of the particles are smaller than 10 microns, or smaller than 6 microns. Diacyl peroxides within the above particle size range have also been found to provide better stain removal especially from plastic dishware, while minimizing undesirable deposition and filming during use in automatic dishwashing machines, than larger diacyl peroxide particles. The optimum diacyl peroxide particle size thus allows the formulator to obtain good stain removal with a low level of diacyl peroxide, which reduces deposition and filming.

Further typical organic bleaches include the peroxy acids, particular examples being the alkylperoxy acids and the arylperoxy acids. Preferred representatives are (a) peroxybenzoic acid and its ring-substituted derivatives, such as alkylperoxybenzoic acids, but also peroxy-a-naphthoic acid and magnesium monoperphthalate, (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperovazelaic acid, diperoxysebacic acid, diperoxybrassylic acid, the diperovphthalic acids, 2-decyldiperoxybutane-1,4-dioic acid, N,N-terephthaloyldi(6-aminopercaproic acid).

Formulations may comprise bleaches and if appropriate bleach activators. Bleaches are subdivided into oxygen bleaches and chlorine bleaches. Use as oxygen bleaches is found by alkali metal perborates and hydrates thereof, and also alkali metal percarbonates. Preferred bleaches in this context are sodium perborate in the form of the mono- or tetrahydrate, sodium percarbonate or the hydrates of sodium percarbonate. Likewise useable as oxygen bleaches are persulfates and hydrogen peroxide. Typical oxygen bleaches are also organic peracids such as perbenzoic acid, peroxy-alpha-naphthoic acid, peroxylauric acid, peroxystearic acid, phthalimidoperoxycaproic acid, 1,12-diperoxydodecanedioic acid, 1,9-diperoxyazelaic acid, diperoxoisophthalic acid or 2-decyldiperoxybutane-1,4-dioic acid. In addition, for example, the following oxygen bleaches may also find use in the detergent formulation: cationic peroxy acids which are described in the patent applications U.S. Pat. Nos. 5,422,028, 5,294,362 and 5,292,447; sulfonylperoxy acids which are described in the patent application U.S. Pat. No. 5,039,447. Oxygen bleaches are used in amounts of generally from 0.5 to 30% by weight, preferably of from 1 to 20% by weight, more preferably of from 3 to 15% by weight, based on the overall detergent formulation. Chlorine bleaches and the combination of chlorine bleaches with peroxidic bleaches may likewise be used. Known chlorine bleaches are, for example, 1,3-dichloro-5,5-dimethylhydantoin, N-chlorosulfamide, chloramine T, dichloramine T, chloramine B, N,N'-dichlorobenzoylurea, dichloro-p-toluenesulfonamide or trichloroethylamine. Preferred chlorine bleaches are sodium hypochlorite, calcium hypochlorite, potassium hypochlorite, magnesium hypochlorite, potassium dichloroisocyanurate or sodium dichloroisocyanurate. Chlorine bleaches are used in amounts of generally from 0.1 to 20% by weight, preferably of from 0.2 to 10% by weight, more preferably of from 0.3 to 8% by weight, based on the overall detergent formulation. In addition, small amounts of bleach stabilizers, for example phosphonates, borates, metaborates, metasilicates or magnesium salts, may be added. They are described in the patent applications U.S. Pat. No. 8,262,804.

Although any chlorine bleach compound may be employed in the compositions of this invention, such as dichloro-isocyanurate, dichloro-dimethyl hydantoin, or chlorinated TSP, alkali metal or alkaline earth metal, e.g. potassium, lithium, magnesium and especially sodium, hypochlorite is preferred. The composition should contain sufficient amount of chlorine bleach compound to provide 0.2 to 4.0% by weight of available chlorine, as determined, for example by acidification of 100 parts of the composition with excess hydrochloric acid. A solution containing 0.2 to 4.0% by weight of sodium hypochlorite contains or provides roughly the same percentage of available chlorine. 0.8 to 1.6% by weight of available chlorine is especially preferred. For example, sodium hypochlorite (NaOCL) solution of from 11 to 13% available chlorine in amounts of 3 to 20%, preferably 7 to 12%, can be advantageously used.

Bleach Activators

Bleach activators are typically organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC). Bleach activators if included in the automatic dishwashing detergent compositions of the invention are in a level of from about 0.1% to about 10%, or from about 0.5% to about 2% by weight of the total composition.

Bleach Catalyst

Bleach catalysts preferred for use herein include the manganese triazacyclononane and related complexes (U.S. Pat. Nos. 6,602,441, 7,205,267, 5,227,084); Co, Cu, Mn and Fe bispyridylamine and related complexes (U.S. Pat. No. 5,114,611); and pentamine acetate cobalt(III) and related complexes (U.S. Pat. No. 4,810,410). A complete description of bleach catalysts suitable for use herein can be found in U.S. Pat. No. 6,599,871, pages 34, line 26 to page 40, line 16. Bleach catalyst if included in the detergent compositions of the invention are in a level of from about 0.1% to about 10%, or from about 0.5% to about 2% by weight of the total composition.

Builders

In addition to improved polymers as a primary builder, other cobuilders suitable to be included in the compositions herein to assist in controlling mineral hardness and dispersancy, with the exception of phosphate builders. Inorganic as well as organic builders can be used. One embodiment of the present invention relates to a gel detergent composition, wherein the builder can be selected from the group consisting of carbonate builders, polycarboxylate compounds, citrate, methyl glycine diacetic acid and/or salts thereof, glutamatic diacetic acid and/or salts thereof and mixtures thereof.

Examples of carbonate builders are the alkaline earth and alkali metal carbonates as disclosed in German Patent Application No. 2,321,001 published on Nov. 15, 1973. Various grades and types of sodium carbonate and sodium sesquicarbonate can be used, certain of which are particularly useful as carriers for other ingredients, especially: detersive surfactants.

Organic detergent builders suitable for the purposes of the present invention include, but are not restricted to, a wide variety of polycarboxylate compounds.

Preferred phosphate builders include mono-phosphates, di-phosphates, tri-polyphosphates or oligomeric-poylphosphates are used. The alkali metal salts of these compounds are preferred, in particular the sodium salts. An especially preferred builder is sodium tripolyphosphate (STPP).

Other useful detergency builders include the ether hydroxypolycarboxylates, copolymers of maleic anhydride with ethylene or vinyl methyl ether, 1, 3, 5-trihydroxy benzene-2, 4, 6-trisulphonic acid, and carboxymethyloxysuccinic acid, the various I alkali metal, ammonium and substituted ammonium salts of polyacetic acids such as ethylenediaminetetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), builders suitable herein due to their availability from renewable resources and their biodegradability.

Methyl glycine diacetic acid and/or salts thereof (MGDA) may also be utilized as builders in the present composition. A preferred MGDA compound is a salt of methyl glycine diacetic acid. Suitable salts include the diammonium salt, the dipotassium salt and, preferably, the disodium salt.

Glutamatic diacetic acid and/or salts thereof (GLDA) may also be utilized as builders in the present composition. A preferred GLDA compound is a salt of glutamic diacetic acid. Suitable salts include the diammonium salt, the dipotassium salt and, preferably, the disodium salt.

Chelating Agents—The compositions herein can also optionally contain one or more transition-metal selective sequestrants, "chelants" or "co-chelating agents", e.g., iron and/or copper and/or manganese chelating agents. Chelating agents suitable for use herein can be selected from the group consisting of aminocarboxylates, polyfunctionally-substituted aromatic chelating agents, and mixtures thereof. Commercial chelating agents for use herein include the BEQUEST™ series, and chelants from Monsanto, DuPont, and Nalco, Inc.

Formulations may comprise other co-builders. It is possible to use water-soluble and water-insoluble builders, whose main task consists in binding calcium and magnesium. The other builders used may be, for example: low molecular weight carboxylic acids and salts thereof, such as alkali metal citrates, in particular anhydrous trisodium citrate or trisodium citrate dihydrate, alkali metal succinates, alkali metal malonates, fatty acid sulfonates, oxydisuccinate, alkyl or alkenyl disuccinates, gluconic acids, oxadiacetates, carboxymethyloxysuccinates, tartrate monosuccinate, tartrate disuccinate, tartrate monoacetate, tartrate diacetate, .alpha.-hydroxypropionic acid; oxidized starches, oxidized polysaccharides; homo- and copolymeric polycarboxylic acids and salts thereof, such as polyacrylic acid, polymethacrylic acid, copolymers of maleic acid and acrylic acid; graft polymers of monoethylenically unsaturated mono- and/or dicarboxylic acids on monosaccharides, oligosaccharides, polysaccharides or polyaspartic acid; aminopolycarboxylates and polyaspartic acid; phosphonates such as 2-phosphono-1,2,4-butanetricarboxylic acid, aminotri(methylenephosphonic acid), 1-hydroxyethylene(1,1-diphosphonic acid), ethylenediaminetetramethylenephosphonic acid, hexamethylenediaminetetramethylenephosphonic acid or diethylenetriaminepentamethylenephosphonic acid; silicates such as sodium disilicate and sodium metasilicate; water-insoluble builders such as zeolites and crystalline sheet silicates.

In addition, formulations may comprise one or more complexing agents. Preferred complexing agents are selected from the group consisting of nitrilotriacetic acid, ethylenediaminetetraacetic acid, diethylenetriaminepentaacetic acid, hydroxyethylethylenediaminetriacetic acid, and methylglycinediacetic acid, glutamic acid diacetic acid, iminodisuccinic acid, hydroxyiminodisuccinic acid, ethylenediaminedisuccinic acid, aspartic acid diacetic acid, and salts thereof.

One class of optional compounds for use herein includes chelating agents or mixtures thereof in combination with the improved inventive polymers. Chelating agents can be incorporated in the compositions herein in amounts ranging from 0.0% to 10.0% by weight of the total composition, preferably from 0.01% to 5.0%.

Suitable phosphonate chelating agents for use herein may include alkali metal ethane 1-hydroxy diphosphonates (HEDP), alkylene poly (alkylene phosphonate), as well as amino phosphonate compounds, including amino aminotri (methylene phosphonic acid) (ATMP), nitrilo trimethylene phosphonates (NTP), ethylene diamine tetra methylene phosphonates, and diethylene triamine penta methylene phosphonates (DTPMP). The phosphonate compounds may be present either in their acid form or as salts of different cations on some or all of their acid functionalities. Preferred phosphonate chelating agents to be used herein are diethylene triamine penta methylene phosphonate (DTPMP) and ethane 1-hydroxy diphosphonate (HEDP). Such phosphonate chelating agents are commercially available from Italmach Chemicals under the trade name DEQUEST™.

Polyfunctionally-substituted aromatic chelating agents may also be useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

Co-builders for use herein include phosphate builders and phosphate free builders. If present, builders are used in a level of from 5% to 60%, from 10% to 50%, or even from 10% to 50% by weight of the detergent composition. In some embodiments the detergent product comprises a mixture of phosphate and non-phosphate builders.

Drying Aids

In another embodiment, the detergent composition of the invention comprises a drying aid. By "drying aid" herein is meant an agent capable of decreasing the amount of water left on washed items, in particular in plastic items that are more prone to be wet after the washing process clue to their hydrophobic nature. Suitable drying aids include polyesters, especially anionic polyesters derived from terephthalic acid, 5-sulphoisophthalic acid or a salt of 5-sulphoisophthalic, ethyleneglycol or polyethyleneglycol, propyleneglycol or polypropyleneglycol, and, polyalkyleneglycol monoalkylethers, optionally together with further monomers with 3 to 6 functionalities which are conducive to polycondensation, specifically acid, alcohol or ester functionalities. Suitable polyesters to use as drying aids are disclosed in WO 2008/110816 and preferably have one or more of the following properties:
  (a) a number average molecular weight of from about 800 Da to about 25,000 Da, or from about 1,200 Da to about 12,000 Da.
  (b) a softening point greater than about 40° C. from about 41° C. to about 200° C., or even 80° C. to about 150° C.;
  (c) a solubility greater than about 6% by weight in water of 3° German hardness at 200° C.

At 30° C. the solubility will typically be greater than about 8% by weight, at 40° C. and 50° C., the solubility will typically be greater than about 40% by as measured in water of 3° German hardness.

Other suitable drying aids include specific polycarbonate-, polyurethane- and/or polyurea-polyorganosiloxane compounds or precursor compounds thereof of the reactive cyclic carbonate and urea type, as described in USPA 2010/0041574 A1 and USPA 2010/0022427 A1. Improved drying can also be achieved by use of non-ionic surfactants, such as:
  (a) $R^1O$—$[CH_2CH(CH_3)O]_x[CH_2CH_2O]_y[CH_2CH(CH_3)O]_zCH_2CH(OH)$—$R^2$, in which $R^1$ represents a linear or branched aliphatic hydrocarbon radical having 4 to 22 carbon atoms or mixtures thereof and $R^2$ represents a linear or branched hydrocarbon radical having 2 to 26 carbon atoms or mixtures thereof, x and z represent integers from 0 to 40, and y represents a integer of at least 15, or from 15 to 50. See for example as in WO 2009/033972; or
  (b) $RO$—$[CHCH(R^a)O]_i[CH_2CH_2O]_m[CH_2CH(R^1)O]_nC(O)$—$R^2$ where R is a branched or unbranched alkyl radical having 8 to 16 carbon atoms, $R^a$ and $R^1$ independently of one another, are hydrogen or a branched or unbranched alkyl radical having 1 to 5 carbon atoms, $R^2$ is an unbranched alkyl radical having 5 to 17 carbon atoms; l and n are independently of one another, an integer from 1 to 5 and m is an integer from 13 to 35, as described in USPA 2008/016721.

Examples of suitable materials include Plurafac LF731 or Plurafac LF-7319 (BASF) and the Dehy Quart® CSP and Poly Quart® range (Cognis).

In one aspect, the detergent composition of the invention comprises from about 0.1% to about 10%, from about 0.5% to about 5% and especially from about 1% to about 4% by weight of the composition of a drying aid.

Rheology Systems

Suitable are various carboxyvinyl polymers, homopolymers and copolymers are commercially available from Lubrizol Advanced Materials, Inc. Cleveland, Ohio, under the trade name CARBOPOL®. These polymers are also known as carbomers or polyacrylic acids. Carboxyvinyl polymers useful in formulations of the present invention include CARBOPOL® 941 having a molecular weight of about 1,250,000, and CARBOPOL 934, 940, 676, 674 having molecular weights of about 3,000,000 and 4,000,000, respectively. The series of CARBOPOL® which use ethyl acetate and cyclohexane in the manufacturing process are also useful, including, but not limited to, for example, CARBOPOL® 690, 691, ETD 2691, ETD 2623, EZ-2, EZ-3, and EZ-4.

The composition may also comprise either a soluble silicate or an associative thickener to address any texture issues that may arise with the use of a xanthan gum thickener. Semi-synthetic thickeners such as the cellulosic type thickeners: hydroxyethyl and hydroxymethyl cellulose (ETHOCEL® and METHOCEL® available from Dow Chemical) can also be used. Mixtures Inorganic clays (e.g. aluminum silicate, bentonite, fumed silica) are also suitable for use as a thickener herein. The preferred clay thickening agent can be either naturally occurring or synthetic. A suitable synthetic clay is the one disclosed in the U.S. Pat. No. 3,843,598. Naturally occurring clays include some smectite and attapulgite clays as disclosed in U.S. Pat. No. 4,824,590.

Suitable polysaccharide polymers for use herein include substituted cellulose materials like carboxymethylcellulose, ethyl cellulose, hydroxyethyl cellulose, hydroxypropyl cellulose, hydroxymethyl cellulose, succinoglycan and naturally occurring polysaccharide polymers like Xanthan gum, gellan gum, guar gum, locust bean gum, tragacanth gum, succinoglucan gum, or derivatives thereof, or mixtures thereof. Xanthan gum is commercially available from Kelco under the tradename Kelzan T™.

Rheology modifiers and thickeners can be present at levels between 0.1% to 5% by weight of the total composition, more preferably 0.5% to 2%, even more preferably 0.8% to 1.2%.

Metal Care Agents

Metal care agents may prevent or reduce the tarnishing, corrosion or oxidation of metals, including aluminium, stainless steel and non-ferrous metals, such as silver and copper. Suitable examples include one or more of the following:
 (a) benzatriazoles, including benzotriazole or bis-benzotriazole and substituted derivatives thereof. Benzotriazole derivatives are those compounds in which the available substitution sites on the aromatic ring are partially or completely substituted. Suitable substituents include linear or branch-chain $C_1$-$C_{20}$-alkyl groups and hydroxyl, thio, phenyl or halogen such as fluorine, chlorine, bromine and iodine.
 (b) metal salts and complexes chosen from the group consisting of zinc, manganese, titanium, zirconium, hafnium, vanadium, cobalt, gallium and cerium salts and/or complexes, the metals being in one of the oxidation states II, III, IV, V or VI. In one aspect, suitable metal salts and/or metal complexes may be chosen from the group consisting of Mn(II) sulphate, Mn(II) citrate, Mn(II) stearate, Mn(II) acetylacetonate, $K_2TiF_6$, $K_2ZrF_6$, $CoSO_4$, $Co(NO_3)_2$ and $Ce(NO_3)_3$, zinc salts, for example zinc sulphate, hydrozincite or zinc acetate;
 (c) silicates, including sodium or potassium silicate, sodium disilicate, sodium metasilicate, crystalline phyllosilicate and mixtures thereof. Further suitable organic and inorganic redox-active substances that act as silver/copper corrosion inhibitors are disclosed in U.S. Pat. No. 5,888,954.

In one aspect, the detergent composition of the invention comprises from 0.1% to 5%, from 0.2% to 4% or from 0.3% to 3% by weight of the total composition of a metal care agent.

The corrosion inhibitors used may, for example, be silver protectants from the group of the triazoles, the benzotriazoles, the bisbenzotriazoles, the aminotriazoles, the alkylaminotriazoles and the transition metal salts or complexes. Particular preference is given to using benzotriazole and/or alkylaminotriazole. In addition, active chlorine-containing agents which can distinctly reduce the corrosion of the silver surface frequently find use in detergent formulations. In chlorine-free detergents, preference is given to using oxygen- and nitrogen-containing organic redox-active compounds such as di- and trihydric phenols, for example hydroquinone, pyrocatechol, hydroxyhydroquinone, gallic acid, phloroglucinol, pyrogallol and derivatives of these compound classes. Salt- and complex-type inorganic compounds such as salts of the metals Mn, Ti, Zr, Hf, V, Co and Ce frequently also find use. Preference is given in this context to the transition metal salts which are selected from the group of the manganese and/or cobalt salts and/or complexes, more preferably from the group of the cobalt (amine) complexes, the cobalt (acetate) complexes, the cobalt (carbonyl) complexes, the chlorides of cobalt or manganese, and of manganese sulfate. It is likewise possible to use zinc compounds or bismuth compounds or sodium silicate to prevent corrosion on the ware.

The formulations can also contain one or more material care agents which are effective as corrosion inhibitors and/or anti-tarnish aids.

Solvents

The improved polymers of the present invention are particularly useful for water-based formulations, water-free formulations, powders, and formulations containing water-miscible auxiliary solvents, but are not limited thereto. Useful solvents commonly employed are typically liquids, such as water (deionized, distilled or purified), alcohols, polyols, and the like, and mixtures thereof. Non-aqueous or hydrophobic auxiliary solvents are commonly employed in substantially water-free products, such as aerosol propellant sprays, automotive and household surface cleaners, or for specific functions, such as removal of oily soils, sebum, stain, or for dissolving dyes, fragrances, and the like, or are incorporated in the oily phase of an emulsion. Non-limiting examples of auxiliary solvents, other than water, include linear and branched alcohols, such as ethanol, propanol, isopropanol, hexanol, and the like; aromatic alcohols, such as benzyl alcohol, cyclohexanol, and the like; saturated $C_{12}$-$C_{30}$ fatty alcohol, such as lauryl alcohol, myristyl alcohol, cetyl alcohol, stearyl alcohol, behenyl alcohol, and the like. Non-limiting examples of polyols include polyhydroxy alcohols, such as glycerin, propylene glycol, butylene glycol, hexylene glycol, $C_2$-$C_4$ alkoxylated alcohols and $C_2$-$C_4$ alkoxylated polyols, such as ethoxylated, propoxylated, and butoxylated ethers of alcohols, diols, and polyols having about 2 to about 30 carbon atoms and 1 to about 40 alkoxy units, polypropylene glycol, polybutylene glycol, and the like. Non-limiting examples of non-aqueous auxiliary solvents include silicones, and silicone derivatives, such as cyclomethicone, and the like, ketones such as acetone and methylethyl ketone; natural and synthetic oils and waxes, such as vegetable oils, plant oils, animal oils, essential oils, mineral oils, $C_7$-$C_{40}$ isoparaffins, alkyl carboxylic esters, such as ethyl acetate, amyl acetate, ethyl lactate, and the like, jojoba oil, shark liver oil, and the like.

Organic Solvent—One embodiment of the present invention relates to a composition comprising an organic solvent selected from the group consisting of low molecular weight aliphatic or aromatic alcohols, low molecular weight alkylene glycols, low molecular weight alkylene glycol ethers, low molecular weight esters, low molecular weight alkylene amines, low molecular weight alkanolamines, and mixtures thereof.

Some of the foregoing non-aqueous auxiliary solvents may also be diluents, solubilizers, conditioners and emulsifiers.

Fillers

Fillers enable the adjustment of the active matter in the detergent to the doses used. Filler products include sodium sulphate in powders, water and solvents in liquids.

Silicates

Suitable silicates are sodium silicates such as sodium disilicate, sodium metasilicate and crystalline phyllosilicates. Silicates f present are at a level of from about 1% to about 20%, or from about 5% to about 15% by weight of the automatic dishwashing detergent composition.

pH Adjusting Agents

A pH adjusting agent can be added to a formulation containing an improved polymer. Thus, the pH adjusting agent can be utilized in any amount necessary to obtain a desired pH value in the final composition. Non-limiting examples of alkaline pH adjusting agents include alkali metal hydroxides, such as sodium hydroxide, and potassium hydroxide; ammonium hydroxide; organic bases, such as triethanolamine, diisopropylamine, dodecylamine, diisopropanolamine, aminomethyl propanol, cocamine, oleamine, morpholine, triamylamine, triethylamine, tromethamine (2-amino-2-hydroxymethyl)-1,3-propanediol), and tetrakis (hydroxypropyl)ethylenediamine; and alkali metal salts of inorganic acids, such as sodium borate (borax), sodium phosphate, sodium pyrophosphate, and the like, and mixtures thereof. Acidic pH adjusting agents can be organic acids, including amino acids, and inorganic mineral acids. Non-limiting examples of acidic pH adjusting agents include acetic acid, citric acid, fumaric acid, glutamic acid, glycolic acid, hydrochloric acid, lactic acid, nitric acid, phosphoric acid, sodium bisulfate, sulfuric acid, tartaric acid, and the like, and mixtures thereof.

Conditioning Aids

The improved polymers of the present invention can be employed in combination with silicone fluids. The most common class of silicone polymers are the linear polydimethyl siloxanes having the general formula $CH_3—(Si(CH_3)_2—O)_w—Si(CH_3)_3$ where w denotes an integer greater than 2. Silicones can also be branched materials wherein one or more alkyl groups in a polymer are replaced with an oxygen to create a branch point. Silicone fluids are typically water-insoluble oils having a viscosity in the range of a few mPas to several hundred thousand mPas.

A class of silicones are the so-called silicone gums, as described, for example in U.S. Pat. No. 4,902,499, incorporated herein by reference, which generally have a viscosity (at about 20° C.) of greater than about 600,000 mPas and have a weight average molecular weight of at least about 500,000 Daltons as determined by intrinsic viscosity measurement.

Another class of silicone materials that are particularly useful in combination with the polymers of the present invention are the volatile silicones. Volatile silicones include cyclic and linear polydimethylsiloxanes, and the like. Cyclic volatile silicones typically contain about 3 to about 7 silicon atoms, alternating with oxygen atoms, in a cyclic ring structure. Each silicon atom is also substituted with two alkyl groups, typically methyl groups. Linear volatile silicones are silicone fluids, as described above, having viscosities of not more than about 25 mPas. A description of volatile silicones is found in Todd and Byers, "Volatile Silicone Fluids for Cosmetics", Cosmetics and Toiletries, Vol. 91(1), pp. 27-32 (1976), and in Kasprzak, "Volatile Silicones," Soap/Cosmetics/Chemical Specialities, pp. 40-43 (December 1986), each incorporated herein by reference.

Other silicone oils include the dimethicone copolyols, which are linear or branched copolymers of dimethylsiloxane (dimethicone) and alkylene oxides. The dimethicone polyols can be random or block copolymers. A generally useful class of dimethicone polyols are block copolymers having blocks of polydimethylsiloxane and blocks of polyalkylene oxide, such as blocks of polyethylene oxide, polypropylene oxide, or both. Silicone fluids, including volatile silicones, silicone gums, and silicone copolymers, are available from a variety of commercial sources such as Dow Corning, Momentive, Wacker Chemie, Shin Etsu and Lubrizol Advanced Materials.

Other oily materials that are useful in combination with the improved polymers of the present invention include, for example, acetylated lanolin alcohols; lanolin alcohol concentrates; esters of lanolin fatty acids such as the isopropyl esters of lanolin fatty acid; polyol fatty acids; ethoxylated alcohols, such as ethoxylate and castor oils; sterols; sterol esters; sterol ethoxylates; and like materials. Many of such esters and ethoxylates are also useful as non-ionic surfactants.

Numerous ingredients are known in the art as conditioning agents and humectants, and in addition to those previously discussed, non-limiting examples include PCA (DL-pyrrolidone carboxylic acid) and its salts, such as lysine PCA, aluminum PCA, copper PCA, chitosan PCA, and the like, allantoin; urea; hyaluronic acid and its salts; ceramides; sorbic acid and its salts; sugars and starches and derivatives thereof; lactamide MEA; and the like.

Color

The improved polymers may also be employed in colored compositions. Accordingly, they may comprise a dye or a mixture thereof.

Perfume Additives

Perfumes and Non-Blooming Perfumes—Perfumes and perfumery ingredients useful in the present compositions and processes comprise a wide variety of natural and synthetic chemical ingredients, including, but not limited to, aldehydes, ketones, esters, and the like.

Buffers

Alkalinity buffers which may be added to the compositions of the invention include monoethanolamine, triethanolamine, borax and the like.

Other materials such as clays, particularly of the water-insoluble types, may be useful adjuncts in compositions of this invention. Particularly useful is bentonite or laponite. This material is primarily montmorillonite which is a hydrated aluminum silicate in which about ⅙th of the aluminum atoms may be replaced by magnesium atoms and with which varying amounts of hydrogen, sodium, potassium, calcium, etc. may be loosely combined. The bentonite in its more purified form (i.e. free from any grit, sand, etc.) suitable for detergents contains at least 50% montmorillonite and thus its cation exchange capacity is at least about 50 to 75 meq per 100 g of bentonite. Particularly preferred bentonites are the Wyoming or Western U.S. bentonites which have been sold as Thixo-jels 1, 2, 3 and 4 by Georgia Kaolin Co. These bentonites are known to soften textiles as described in British Patent No. 401, 413 to Marriott and British Patent No. 461,221

In addition, various other detergent additives or adjuvants may be present in the detergent product to give it additional desired properties, either of functional or aesthetic nature.

Improvements in the physical stability and anti-settling properties of the composition may be achieved by the addition of a small effective amount of an aluminum salt of a higher fatty acid, e.g., aluminum stearate, to the composition. The aluminum stearate stabilizing agent can be added in an amount of 0 to 3%, preferably 0.1 to 2.0% and more preferably 0.5 to 1.5%.

There also may be included in the formulation, minor amounts of soil suspending or anti-redeposition agents, e.g. polyvinyl alcohol, fatty amides, sodium carboxymethyl cellulose, hydroxy-propyl methyl cellulose. A preferred anti-redeposition agent is sodium carboxylmethyl cellulose having a 2:1 ratio of CM/MC which is sold under the tradename Relatin DM 4050.

Unit Dose

In one aspect, the detergent composition of the invention is in unit dose form. Detergent products in unit dose form include tablets, capsules, sachets, pouches, pods, etc. The detergent compositions may be in a form of liquid, gel or powder. In one aspect, for use herein are tablets wrapped with a water-soluble film and water-soluble pouches. The weight of the composition of the invention is from about 10 to about 25 grams, from about 12 to about 24 grams or even from 14 to 22 grams. These weights are extremely convenient for detergent product dispenser fit. In the cases of unit dose products having a water-soluble material enveloping the detergent composition, the water-soluble material is not considered as part of the composition. In one aspect, the unit dose form is a water-soluble pouch (i.e., water-soluble film enveloping detergent composition), in one aspect, a multi-compartment pouch having a plurality of films forming a plurality of compartments. This configuration contributes to the flexibility and optimization of the composition. It allows for the separation and controlled release of different ingredients. In one aspect, one compartment contains detergent composition in solid form and another compartment contains detergent composition in liquid form.

In one aspect, the films of these two compartments have different dissolution profiles, allowing the release of the same or different agents at different times. For example, the agent from one compartment (first compartment) can be delivered early in the washing process to help with soil removal and a second agent from another compartment (second compartment) can be delivered at least two minutes, or even at least five minutes later than the agent from the first compartment.

A multi-compartments pack is formed by a plurality of water-soluble enveloping materials which form a plurality of compartments, one of the compartments would contain the automatic detergent composition of the invention, another compartment can contain a liquid composition, the liquid composition can be aqueous (i.e. comprises more than 10% of water by weight of the liquid composition) and the compartment can be made of warm water soluble material. In some embodiments the compartment comprising the dishwashing detergent composition of the invention is made of cold water soluble material. It allows for the separation and controlled release of different ingredients. In other embodiments all the compartments are made of warm water soluble material.

Process of Laundry Powder Detergents:

A process for making a high active, high bulk density detergent composition as well as the composition itself, the process comprising the steps of (i) introducing a binder component, comprising a neutralized or partially neutralized surfactant, surfactant precursor, improved polymer, and/or its salts and a solid component of initial particle size from submicron to 500 µm into a high shear mixer to thereby form a particulate mixture and (ii) subjecting said mixture to high shear mixing and thereby granulating 'the components to form granules of a size within the range of from 1 to 1200 µm. Preferably after this mixing a coating agent such as zeolite is added to the mixer.

The detergent composition is suitably a complete detergent composition. The term "complete" is used to refer to a detergent composition comprising sufficient surfactant, builder, and alkalinity source to function as an effective fabric washing powder. Alkalinity source refers to soda ash or phosphates. The term "complete" does not restrict the addition of certain minor components in conventional amounts for example at weights of less than 5%. Such minor components include enzymes, bleach, perfume, anti-deposition agent, or dye, to enhance the performance of the washing powder.

The particulate detergent composition may, if desired, be used as a feedstock in a detergent production process. For example, a liquid component surfactant such as nonionic surfactant may be sprayed onto the composition and it may then be coated with for example zeolite. If the detergent composition is used as a feedstock, it is preferred that it be the direct product of the process of the present invention. That is, additional components are not incorporated into the detergent particles prior to their use as a feedstock. However, if desired, the particles may be admixed with separate particles comprising other materials. This provides the advantage of allowing the detergent composition to be produced at one location by a single-step process and optionally admixture with separate particles and then transported to a remote location for storage or further processing as desired.

As a result of this viscosity increase, the process appears to be more easily controlled resulting in better powder properties for the detergent composition.

Examples of such viscosity raising components are water and, particularly, fatty acid in combination with a stoichiometric amount of alkaline material (such as caustic soda) sufficient to neutralize the fatty acid which obviously results in the formation of soap.

In the process a solid component, which can comprise detergency builders such as water-soluble alkaline inorganic materials (for example sodium carbonate seeded with calcium carbonate), zeolite, sodium tripolyphosphate, other water-soluble inorganic materials, for example, sodium bicarbonate or silicate, fluorescers, polycarboxylate polymers, anti-redeposition agents and fillers, is mixed with a binder component which in addition to a neutralized or partially neutralized surfactant can comprise water, silicate solution, liquid polymer components, polyethylene glycols, perfumes, fatty acids and other materials. In the context of the present invention, the term binder component includes any component which is plastically deformable under conditions encountered during the process.

Examples of materials which may be postdosed to the composition include enzymes, bleaches, bleach precursors, bleach stabilizers, lather suppressors, perfumes and dyes. Liquid or pasty ingredients may conveniently be absorbed on to solid porous particles, generally inorganic, which may then be postdosed to the composition obtained by the process of the invention.

The process is very flexible with respect to the chemical composition of the starting materials. Phosphate as well as zeolite built compositions may be made. The process is also suitable for preparing calcite/carbonate containing compositions.

The particulate solid component has an initial particle size of 0.1 to 500 µm, preferably 1 to 350 µm, more preferably from 0.1 to 300 µm. The solid component preferably comprises from 5 to 95% of detergent builders, more preferably from 10 to 80%, most preferably from 20 to 60% by weight.

Preferably the binder component also comprises the improved polymers and/or its salts. Preferably the binder component comprises a mixture of neutralized or partially neutralized, or unneutralized surfactants for example a mixture of linear or primary alkylbenzene sulfonate or sulfonic acid containing from 11 to 14 carbon atoms and a $C_{12}$ to $C_{15}$ primary alcohol ethoxylated with 3 to 7 moles of ethylene oxide per mole of alcohol in a weight ratio of anionic to nonionic of 3 to 1 or a mixture of a $C_{14}$ to $C_{17}$ primary or secondary alcohol sulphate with a $C_{12}$ to $C_{15}$ primary alcohol ethoxylated with 3 to 7 moles of ethylene oxide per mole of alcohol in a weight ratio of 2 to 1.

The high shear mixer advantageously used to carry out the process is preferably a Littleford™ FM 130D mixer. This apparatus consists essentially of a large, static hollow cylinder with its longitudinal axis horizontal. Along this axis is a rotating shaft with several different types of blades mounted thereon. Preferably, when used to carry out the process of the present invention the shaft tip speed is between 1 m/sec and 20 m/sec, more preferably 1 m/sec and 12 m/sec. The mixer can be equipped with one or more high speed cutters and preferably these are operated at tip speeds from 15 m/sec to 80 m/sec, more preferably from 20 m/sec to 70 m/sec. Other suitable mixers for the process of the invention are the Lodige™, Eirich™ RVO2, Powrex™ VG100, Zanchetta™, Schugi™ and Fukae™.

In the process, the solid component is fed into the mixer followed by the binder component which is either sprayed on to the solid component or pumped into the mixer. The components are mixed for a total residence time preferably of from 0.2 to 8 minutes, more preferably of from 0.25 to 5 minutes. Optimally after this mixing time a coating agent such as zeolite can be added to the mixer and the mixer operated with only the main shaft for 20 to 60 seconds. The granules made by the process preferably have a bulk density of from 600 g/liter to 1150 g/liter and a particle size (measured by Rosin-Rammler) of from 300 to 1,200 μm more preferably from 400 to 800 μm.

The ratio of binder component to solid component is preferably in a weight ratio of from 3:2 to 2:3, more preferably 1:1 to 2:3.

The process is operated at a temperature from ambient to 60° C., more preferably from ambient to 40° C.

Preparation of Spray-Dried Laundry Detergent:

An aqueous alkaline laundry detergent slurry comprising: water, alkyl benzene sulphonate, sodium silicate; improved polymer (e.g., acrylic/itaconic acid co-polymer), sodium sulphate, sodium carbonate, magnesium sulphate, and other optional ingredients is prepared. This aqueous slurry is sprayed into a counter current spray drying tower and spray-dried to produce spray-dried laundry detergent powder.

The amount of each chemical component described is presented exclusive of any solvent or diluent, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

Test Methods

Viscosity

Brookfield rotating spindle method (all viscosity measurements reported herein are conducted by the Brookfield method whether mentioned or not): The viscosity measurements are calculated in mPa·s, employing a Brookfield rotating spindle viscometer, Model RVT (Brookfield Engineering Laboratories, Inc.), at about 20 revolutions per minute (rpm), at ambient room temperature of about 20 to 25° C. (hereafter referred to as viscosity). Spindle sizes are selected in accordance with the standard operating recommendations from the manufacturer. Generally, spindle sizes are selected as follows:

| Spindle Size No. | Viscosity Range (mPa · s) |
|---|---|
| 1 | 1-50 |
| 2 | 500-1,000 |
| 3 | 1,000-5,000 |
| 4 | 5,000-10,000 |
| 5 | 10,000-20,000 |
| 6 | 20,000-50,000 |
| 7 | >50,000 |

The spindle size recommendations are for illustrative purposes only. The artisan of ordinary skill in the art will select a spindle size appropriate for the system to be measured.

Turbidity Testing

The turbidity of a composition containing a polymer of the invention is determined in Nephelometric Turbidity Units (NTU) employing a Nephelometric turbidity meter with distilled water (NTU=0) as the standard.

Molecular Weight Determination

The weight average molecular weights referenced herein are measured by GPC using a Waters Model 515 pump, Waters Model 717 WISP autosampler with Waters Model 2410 Refractive Index @ 40° C. Approximately 0.01 g polymer sample is dissolved in 10 ml of 97.5% 0.1M Sodium Nitrate with 2.5% tetrahydrofuran (THF). The test sample solution is gently shaken for about two hours and filtered by passing the sample solution through a 0.45 μm PTFE disposable disc filter. The chromatographic conditions are: Mobile phase: 97.5% 0.1M Sodium Nitrate/2.5% THF (pH=10), 0.7 ml/min. Sample size: 100 μl Column set: TOSOH Guard+2× TSKgel GMPW×1 (13u), 300×7.8 mm, @ 35° C. Waters Empower Pro LC/GPC software is used to analyze the results and to calculate $M_w$ of the polymers of the invention.

The molecular weight calibration curve was established with polyacrylic acid standards contained in the "PSS-PAAKIT" from Polymer Standards Service-USA. Acrylic acid with MW=94 Daltons was added to one standard. The calibration curve covered an Mp range from 94 to $1.10 \times 10^6$ Daltons.

$^1$H NMR

Nuclear magnetic resonance (NMR) spectroscopy is an analytical technique that can help determine among other things detailed information about the structure, molecular dynamics, and chemical environment of molecules. The $^1$H NMR spectra referenced herein are measured by dissolving the samples in $D_2O$ solvent in 5 mm NMR tubes and observed by $^1$H NMR on the Bruker AV500.

The $^1$H NMR spectra referenced herein are measured by dissolving the samples in $D_2O$ solvent in 5 mm NMR tubes and observed by $^1$H NMR on the Bruker AV500.

Residual Monomers

Residual monomers such as, itaconic acid, acrylic acid and AMPS are measured by HPLC using a Varian 5020 with UV detector, Spectra-Physics 4100 data analyzer and column C-18 modified silica such as Phenomenex Jupiter 5u C-18 300A, 4.6 mm I.D.×25 cm at 20° C. Mobile phase is the solution of 0.01M $KH_2PO4$ with flow rate 1 ml/minute. Monomer detection limit is <5 ppm.

Calcium Binding Capacity:

The calcium chelating capacity of the polymers is measured using Thermo Orion Calcium Ion Selective Electrode (ISE) connected to an Orion Start Plus Meter. The instrument is calibrated using four standard (Calcium chloride ($CaCl_2$) solutions with concentrations of 0.0001 M, 0.001 M, 0.01 M and 0.1 M. 1% chelator solution is prepared in DI water and its pH is adjusted to desired value using NaOH solution.

The following procedure is used for a typical sample titration:

Burette is filled with 1% chelator solution.

In a 250 mL beaker containing a magnetic stir bar, 100 mL of 0.01 M $CaCl_2$ solution is placed. 2 mL of Ionic Strength Adjuster (ISA) is added.

The ISE and reference electrodes are rinsed with distilled water, wiped and placed in the solution.

The chelator solution is titrated from the burette and the $Ca^{2+}$ concentration is monitored in the Orion Star Plus meter.

The chelator solution is added gradually until the meter shows 0.00 M concentration of $Ca^{2+}$.

The end point of the titration is used to calculate the Calcium binding capacity of the polymer in mg of $CaCO_3$/g of polymer using the following equation:

$$\text{mg of } CaCO_3/\text{g of polymer} = \frac{0.100087 * M}{0.01} * 100 * \frac{1000}{BR}$$

where M=starting molarity of $CaCl_2$ solution and BR=Burette reading, mL at the end point of the titration.

Abbreviations

The following abbreviations and trade names are utilized in the examples.

Abbreviations and Trade Names

| Abbreviation | Chemical Name |
| --- | --- |
| IA | Itaconic acid |
| AA | Acrylic acid |
| AMPS ™ Monomer | 2-acrylamido-2-methylpropane sulfonic acid (Lubrizol Advanced Materials, Inc.) sodium salt |
| SPS | Sodium persulfate |
| FF6 | Reducer (mixture of a disodium salt of 2-hydroxy-2-sulfinatoacetic acid and sodium sulfite) available from Brüggolit |
| NaOH | Sodium hydroxide |
| STPP | Sodium tripolyphosphate |
| EDTA | Ethylenediaminetetraacetic acid |
| PAA | Low molecular weight polyacrylic acid (Source: [1]Acusol 445 from Dow; [2]Noverite K-752 from Lubrizol) |
| PIA | Polyitaconic acid (Source: [3]Itaconix DSP-2K) |
| P(AA/MA) | Acrylic acid/maleic acid copolymer ([4]Sokalan CP-45 and [5]Sokalan CP-5 from BASF) |
| MaA | Maleic Acid |
| MA | Methyl acrylate |
| ABE | Allylbutyl ether |
| EA | Ethyl acrylate |
| AOE | Allyloxy ethanol |
| Hitenol KH-10 | Allyl ether of alkyl poyoxyethylene glygol containing sodium sulfate side chain sold by Dai-Ichi Kogyo Seiyaku Co., Ltd, Japan |
| RAL 100 | Alkoxylated allyl ether |
| nBA | n-Butyl acrylate |
| 2EHA | 2-ethylhexyl acrylate |
| SSS | Sodium styrene sulfonate |
| COPS1 | Sodium Allyoxy-2-hydroxypropane sulfonate |
| A55 | Perfectocote A55 starch |
| PVA | Polyvinyl alcohol |
| PE | Pentaerythritol |

[1]CL1;
[2]CL2;
[3]CL3;
[4]CL4; and
[5]CL5;

Sample 1

Into an agitator equipped reactor containing 520 grams of deionized water (D.I.), 520 grams of isopropyl alcohol, and 474.5 grams of itaconic acid were added under nitrogen atmosphere and mixed at 300 rpms. The contents of the reactor were heated to about 82° C. with mixing agitation (300 rpm) under a nitrogen atmosphere for 30 minutes. When the contents of the reactor reached a temperature of approximately 82° C., 97.5 grams of FF6 solution (6.66% aqueous solution weight/weight), 106.6 grams of sodium persulfate solution (26.7 percent aqueous solution weight/weight), 18.7 grams of 35% $H_2O_2$ were injected into the heated IA solution. Immediately, a metered addition of 26.8 percent sodium persulfate solution (aqueous solution weight/weight) was started at 0.85 mL/minute into the reaction mixture for 105 minutes. Along with metered initiator, the comonomer solution, made from 175.5 grams AA monomer, is also gradually metered (1.86 g/min.) into the reactor over a period of about 90 minutes to react with IA. The temperature of the reaction was maintained at about 82-85° C. for an additional four hours to complete the polymerization and followed by solvent exchange with water at 65° C. The resulting copolymer product was cooled to room temperature and adjusted to pH to 3.0-3.5 with 50% NaOH before discharging from the reactor. The final product was identified as a copolymer of itaconic acid and acrylic acid with partial IPA esterification based on proton NMR (a peak at 1.24 ppm from IPA ester content). Additionally, the final product contains lactone structures (peaks at 1.47 and 1.39 ppm) which can come from both itaconic and acrylic acid.

Samples 2-4

Polymer samples 2 through 4 were also synthesized for reproducibility as set forth in Sample 1. The monomer components for these examples were set forth in Table 1 below. All polymers contained partial esterification and traces of lactone structures on the backbone.

TABLE 1

Partially Esterified Itaconic acid/acrylic acid copolymers in Water/IPA Mixture

| Sample ID | Wt % IPA/DIW | Mole % IA/AA | Wt % IA/AA | Temp ° C. | % TS | Viscosity cP | % Conversion (total, ppm) | Mn | PDI | NTU | Color (Gardner) |
|---|---|---|---|---|---|---|---|---|---|---|---|
| 1 | 50/50 | 60/40 | 73/27 | 82 | 44.2 | 145 | 99.8 | 1568 | 1.57 | 5.54 | <1 |
| 2 | 60/40 | 60/40 | 73/27 | 82 | 45.5 | 261 | 99.95 | 2557 | 1.93 | 3.38 | 1 |
| 3 | 50/50 | 60/40 | 73/27 | 75 | 40.8 | 254 | 99.8 | 1891 | 1.64 | 3.44 | <1 |
| 4 | 50/50 | 60/40 | 73/27 | 82 | 44.6 | 296 | 99.9 | 3254 | 2.56 | 2.71 | 4 |

Sample 5

Into an agitator equipped reactor containing 475 grams of deionized water (D.I.), 475 grams of isopropyl alcohol, and 456.25 grams of itaconic acid were added under nitrogen atmosphere and mixed at 300 rpms. The contents of the reactor were heated to about 82° C. with mixing agitation (300 rpm) under a nitrogen atmosphere for 30 minutes. When the contents of the reactor reached a temperature of approximately 82° C., 37 grams of 4.43% of t-butyl perpivalate solution in 1:1 wt/v of deionized water and isopropyl alcohol, 46.8 grams of FF6 solution (6.66% aqueous solution weight/weight), 101.6 grams of sodium persulfate solution (26.7 percent aqueous solution weight/weight), 17.8 grams of 35% $H_2O_2$ were injected into the heated IA solution. Immediately, a metered addition of 26.8 percent sodium persulfate solution (aqueous solution weight/weight) is started at 0.88 mL/minute into the reaction mixture for 105 minutes. Along with metered initiator, the comonomer solution, made from 168.75 grams AA monomer, was also gradually metered (1.86 g/min.) into the reactor over a period of about 90 minutes to react with IA. The temperature of the reaction was maintained at about 82-85° C. for an additional four hours to complete the polymerization. The resulting copolymer product was cooled to room temperature and adjusted the product pH to 3.0-3.5 with 50% NaOH before discharging from the reactor. The final product was identified as a copolymer of itaconic acid and acrylic acid with partial IPA esterification based on proton NMR (a peak at 1.24 ppm from IPA ester content). Additionally, the final product contained lactone structures (peaks at 1.47 and 1.39 ppm) which can come from both itaconic and acrylic acid.

Samples 6-16

Polymer samples 6 through 16 were also synthesized as set forth in Sample 5 by varying either monomer or solvent or solvent ratios. The monomer components for these samples were set forth in Table 2 below. All polymers contained partial esterification and traces of lactone structures on the backbone.

TABLE 2

Partially Esterified Itaconic acid/acrylic acid copolymers in Water/IPA Mixture

| Sample ID | Wt % IPA/DIW | Mole % IA/AA | Wt % IA/AA | Temp ° C. | % TS | Viscosity cP | % Conversion (total, ppm) | Mn | PDI | NTU | Color (Gardner) |
|---|---|---|---|---|---|---|---|---|---|---|---|
| 5 | 50/50 | 60/40 | 73/27 | 82 | 44.9 | 166 | 99.8 | 1691 | 1.63 | 4.04 | <1 |
| 6 | 60/40 | 60/40 | 73/27 | 82 | 45.2 | 285 | 99.7 | 2521 | 1.93 | 1.37 | <1 |
| 7 | 50/50 | 60/40 | 73/27 | 75 | 43.4 | 174 | 99.8 | 1952 | 1.69 | 4.17 | <1 |
| 8 | 50/50 | 40/60 | 54.6/45.4 | 75 | 37.9 | 153.6 | 99.99 | 2826 | 2.56 | 5.54 | <1 |
| 9 | 50/50 | 50/50 | 64.4/35.6 | 75 | 42.5 | 242 | 99.99 | 2470 | 1.95 | 3.12 | <1 |
| 10 | 50/50 | 25/75 | 36.4/63.6 | 75 | 43.1 | 240 | 99.999 | 2938 | 2.78 | 2.92 | <1 |
| 11 | 50/50 | 75/25 | 84.4/15.6 | 75 | 43.3 | 116 | 98.5 | 1586 | 1.64 | 3.49 | 2 |
| 12 | 75/25 | 60/40 | 73/27 | 75 | 44.1 | 177 | 98.8 | 1635 | 1.72 | 4.97 | 2 |
| 13 | 25/75 | 60/40 | 73/27 | 75 | 44.2 | 310 | 99.999 | 2775 | 1.89 | 3.11 | <1 |
| 14 | 50/50 | 35/65 | | 75 | 42.03 | 256.8 | 99.98 | 3331 | 2.72 | 4.41 | <1 |
| 15 | 50/50 | 30/70 | 43.8/56.2 | 75 | 42.7 | 290 | | 3248 | 2.8 | | |
| 16 | 50/50 Ethanol/water | 40/60 | 54.6/45.4 | 75 | 43 | 330 | | 3882 | 3.32 | | |

Sample 17

Into an agitator equipped reactor containing 540 grams of deionized water (D.I.), 339 grams of isopropyl alcohol, and 571.5 grams of itaconic acid were added under nitrogen atmosphere and mixed at 300 rpms. The contents of the reactor were heated to about 82° C. with mixing agitation (300 rpm) under a nitrogen atmosphere for 30 minutes. When the contents of the reactor reached a temperature of approximately 82° C., 71.5 grams of FF6 solution (10.0% aqueous solution weight/weight), 133.2 grams of sodium persulfate solution (27.0 percent aqueous solution weight/weight), 15.4 grams of 35% $H_2O_2$ were injected into the heated IA solution. Immediately, a metered addition of 25.1 percent sodium persulfate solution (aqueous solution weight/weight) is started at 1.15 mL/minute into the reaction mixture for 105 minutes. Along with the metered initiator, the comonomer solution, made from 157.5 grams AA monomer and 328.2 grams of AMPS 2403 monomer, was also gradually metered (4.69 g/min.) into the reactor over a period of about 90 minutes to react with IA. The temperature of the reaction was maintained at about 82-85° C. for an additional four hours to complete the polymerization and followed by solvent exchange with water at 65° C. The resulting product derived from itaconic acid/acrylic acid/AMPS was cooled to room temperature and adjusted to pH to 3.0-3.5 with 50% NaOH before discharging from the reactor. The final product was identified as a terpolymer of itaconic acid, acrylic acid and AMPS with partial IPA esterification based on proton NMR (a peak at 1.24 ppm from IPA ester content). Additionally, the final product contained lactone structures (peaks at 1.47 and 1.39 ppm) which can come from both itaconic and acrylic acid.

Sample 18

Polymer sample 18 was also synthesized as set forth in Sample 17 by varying solvent and solvent ratio. The monomer components for these samples are set forth in Table 3 below. All polymers contained partial esterification and traces of lactone structures on the backbone.

TABLE 3

Partially Esterified Itaconic acid/Acrylic acid/AMPS Terpolymer in Water/IPA or Ethanol Mixture

| Sample ID | Solvent ratio | Mole % IA/AA/AMPS | Wt % IA/AA/AMPS | Temp ° C. | % TS | Viscosity cP | % Conversion (total, ppm) | Mn | PDI | NTU | Color (Gardner) |
|---|---|---|---|---|---|---|---|---|---|---|---|
| 17 | 63/37 IPA/DIW | 60/30/10 | 63.5/17.5/19 | 82 | 46.4 | 182 | 99.999 | 2531 | 1.91 | 1.53 | 2 |
| 18 | 50/50 | 60/30/10 | 63.5/17.5/19 | 75 | 42.4 | 263 | | 3674 | 2.1 | | |

Sample 19-23

Polymer samples 19-23 were also synthesized as set forth in Sample 17 by varying solvent ratio and other comonomers such as maleic acid (MaA) or methyl acrylate (MA) to make other copolymers. The monomer components for these samples are set forth in Table 3A below. All polymers contained partial esterification and traces of lactone structures on the backbone. Additionally, polymers 21-23 contain ester peaks derived from methyl acrylate. It is being noted the color stability of three polymers (19, 20 and 23) containing maleic acid was better than non-maleic acid version upon aging for nearly one year at room temperature.

TABLE 3A

Partially Esterified Copolymers with other Monomers

| Sample ID | Wt % IPA/DIW | Mole % IA/AA/Other Monomers | Temp ° C. | % TS | Viscosity cP | % Conversion (total, ppm) | Mn | PDI | NTU |
|---|---|---|---|---|---|---|---|---|---|
| 19 | 60/40 | 36/62.4/1.6 MaA | 75 | 41.71 | 231 | 99.999 | 2660 | 2.66 | 11.5 |
| 20 | 60/40 | 31.5/66.9/1.6 MaA | 75 | 42.8 | 309 | 99.999 | 2750 | 2.75 | 13.6 |
| 21 | 50/50 | 32.5/63.5/4 MA | 75 | 42.32 | 354 | 99.999 | 2796 | 2.8 | 16.0 |
| 22 | 50/50 | 32.5/63.5/4 MA | 75 | 51.87 | 1376 | 99.999 | 3120 | 3.08 | 1.05 |
| 23 | 50/50 | 34/59/5.5 MA/1.5 MaA | 75 | 49.53 | 1120 | 99.999 | 3140 | 3.18 | 1.32 |

Sample 24

Into an agitator equipped reactor containing 675 grams of deionized water (D.I.), 9.0 grams of 50 wt % NaOH solution, 9 grams of sodium formate and 208.8 grams of itaconic acid are added under nitrogen atmosphere and mixed at 300 rpms. The contents of the reactor are heated to about 60-70° C. with mixing agitation (300 rpm) under a nitrogen atmosphere for 30 minutes. When the contents of the reactor reaches a temperature of approximately 75° C., 52.62 grams of initiator solution made from 0.094 wt % of t-butyl perpivalate solution mixed with 0.003 wt % of sodium dodecyl sulfate, 34 grams of FF6 solution (0.084% aqueous solution weight/weight), 83.7 grams sodium persulfate solution (30 percent aqueous solution weight/weight) and 12.86 grams of 35 wt % $H_2O_2$ are injected into the heated IA solution in 5 minutes interval. After 5 minutes, 30 percent sodium persulfate solution (aqueous solution weight/weight) is also metered at 0.52 mL/minute into the reaction mixture for 120 minutes. Concurrently, the co-monomer solution, made from 225 grams AA monomer mixed with 16.2 grams MA monomer, is also gradually metered (1.91 ml/min.) into the reactor over a period of about 120 minutes to react with IA. The temperature of the reaction is maintained at about 75° C. for an additional four hours to complete the polymerization. The resulting copolymer of itaconic acid/acrylic acid/methyl acrylate product is cooled to room temperature and the pH of the product is adjusted to 3.5 with 50% NaOH before discharging from the reactor.

Samples 25-34

Polymer samples 25-34 were also synthesized as set forth in Sample 24 by varying comonomer types to make copolymers containing ester groups. The monomer components for these samples are set forth in Table 3B below. All polymers contain ester peaks due to the presence of different ester monomers.

TABLE 3B

Terpolymers containing Ester Comonomers

| Sample ID | Ester Comonomer | Mole % IA/AA | HCOONa | % TS | Viscosity cP | NTU | Mn | PDI |
|---|---|---|---|---|---|---|---|---|
| 24 | MA | 32.5/63.5/4 | 2 | 34.35 | 104 | 1.26 | 5083 | 4.62 |
| 25 | MA/MaA | 34/59/5.5/1.5 | 1 | 34.14 | 98.4 | 0.77 | 4999 | 4.45 |
| 26 | MA | 35/59/6 | 2 | 34.99 | 108 | 1.1 | 4131 | 4.59 |
| 27 | MA | 35/55/10 | 2 | 35.51 | 115.2 | 2.26 | 4549 | 4.85 |
| 28 | ABE | 35/62/3 | 2 | 33.72 | 115.2 | 14.4 | 4527 | 4.73 |
| 29 | EA | 35/62/3 | 2 | 36.01 | 185.6 | 4.19 | 5481 | 4.96 |
| 30 | AOE | 35/62/3 | 2 | 36.68 | 314.4 | 2.64 | 6635 | 7.25 |
| 31 | Kitenol KH-10 | 35/64/1 | 2 | 35.48 | 261 | 2.19 | 6387 | 7.79 |
| 32 | RAL 100 | 35/64/1 | 2 | 35.38 | 202.4 | 5.52 | 5976 | 8.36 |
| 33 | nBA | 35/63.5/1.5 | 2 | 34.97 | 149 | 12.8 | 5451 | 5.53 |
| 34 | 2EHA | 35/64/1 | 2 | 34.82 | 144 | 235 | 5435 | 5.36 |

Samples 35-49

Polymer samples 25-34 were also synthesized as set forth in Sample 24 by adding different levels of various additives (A55, PVA, PE, sodium formate and sodium citrate) to lower the molecular weight of the resulting polymers. The monomer components for these samples are set forth in Table 3C below.

TABLE 3C

Itaconic acid Copolymers with Additives

| Sample ID | Comonomer | Mole % IA/AA | Additive | Sodium citrate | Sodium Formate | % TS | Viscosity cP | NTU | Mw | PDI |
|---|---|---|---|---|---|---|---|---|---|---|
| 35 | none | 35/65 | None | None | 0 | 36.05 | 384 | 7.23 | 9233 | 5.93 |
| 36 | none | 35/65 | None | None | 2 | 35.56 | 282.4 | 4.99 | 7741 | 5.72 |
| 37 | none | 35/65 | 5 wt % A55 | None | 2 | 35.57 | 99.23 | 3 | 4160 | 4 |
| 38 | none | 35/65 | 3 wt % A55 | 2 | None | 35.98 | 104 | 1.83 | 3398 | 6.45 |
| 39 | none | 35/65 | 10 wt % A55 | 2 | None | 35.42 | 106 | 8 | 3243 | 7.19 |
| 40 | MA | 40/50/10 | 3 wt % A55 | 2 | None | 38.24 | 156.8 | 10.6 | 3261 | 5.97 |
| 41 | COPS1 | 40/58/2 | 3 wt % A55 | 2 | None | 38.81 | 218.4 | 9.88 | 4037 | 6.73 |
| 42 | MA | 40/50/10 | 3 wt % A55 | None | 2 | 37.55 | 138.4 | 10.3 | 3453 | 5.29 |
| 43 | SSS | 40/58/2 | 3 wt % A55 | None | 2 | 37.80 | 132.0 | 8.02 | 3249 | 4.90 |
| 44 | MA | 40/50/10 | 1 wt % PVA | None | 2 | 36.22 | 138.4 | 22.3 | 3580 | 6.95 |
| 45 | MA | 40/50/10 | 3 wt % PVA | None | 2 | 37.65 | 319.2 | 119 | 4557 | 9.54 |
| 46 | SSS | 40/58/2 | 1 wt % PVA | None | 2 | 36.81 | 140.0 | 8.44 | 3777 | 5.48 |
| 47 | SSS | 40/58/2 | 1 wt % PE | None | 2 | 36.89 | 116.8 | 6.11 | 3772 | 3.48 |
| 48 | MA | 40/50/10 | 1 wt % PE | None | 2 | 36.86 | 123.2 | 5.41 | 4037 | 4.16 |
| 49 | MA | 40/50/10 | 2 wt % PE | None | 2 | 37.24 | 145.6 | 7.07 | 4665 | 4.17 |

The Ca2+ binding capacity at pH 10.5 for partially esterified itaconic acid copolymers are summarized below in the table 4. All inventive copolymers at pH 10.5 have superior Ca binding capacities than CL1 and CL2. Copolymer samples 1 through 16 showed equal or better performance than CL4 and CL5.

TABLE 4

Ca2+ binding capacity of partially esterified IA copolymers at pH 10.5

| Sample ID | mg CaCO3/g of polymer at pH 10.5 |
|---|---|
| CL1 | 176.82 |
| CL2 | 149.34 |
| CL3 | 309.64 |
| CL4 | 206.77 |
| CL5 | 255.22 |
| 1 | 263.39 |
| 2 | 297.13 |
| 3 | 340.92 |
| 4 | 312.77 |
| 5 | 272.46 |
| 6 | 280.84 |
| 7 | 351.92 |
| 8 | 288.48 |
| 9 | 297.2 |
| 10 | 227.69 |
| 11 | 241.24 |
| 12 | 233.53 |
| 13 | 271.66 |
| 14 | 289.4 |
| 15 | 265.1 |
| 16 | 266.9 |
| 17 | 189.05 |
| 18 | 247.13 |
| 24 | 230.43 |
| 25 | 232.76 |
| 26 | 238.18 |
| 27 | 225.36 |
| 28 | 286.39 |
| 29 | 275.92 |
| 30 | 274.96 |
| 31 | 275.25 |
| 32 | 266.03 |
| 33 | 274.38 |
| 34 | 289.35 |

Control Sample 1

Into an agitator equipped reactor containing 500 grams of deionized water (D.I.), 317.5 grams of itaconic acid and 15 grams of 50% NaOH were added under nitrogen atmosphere and mixed at 300 rpms. The contents of the reactor were heated to about 60° C. with mixing agitation (300 rpm) under a nitrogen atmosphere for 30 minutes. When the contents of the reactor reached a temperature of approximately 60° C., 71 grams of FF6 solution (7% aqueous solution weight/weight) and 52.2 grams of sodium persulfate solution (3.83 percent aqueous solution weight/weight) were injected into the heated IA solution in 10 minute intervals. After 30 minutes, the reaction temperature was raised to 80° C. When the contents of the reactor reached a temperature of approximately 80° C., 8.6 grams of 35% $H_2O_2$ was added as batch in 2 additions and followed by metered addition of 28.5 percent sodium persulfate solution (aqueous solution weight/weight) at 0.43 mL/minute into the reaction mixture for 135 minutes. Concurrently, the comonomer solution, made from 87.5 grams AA monomer mixed with 181.64 grams of AMPS 2403 monomer, was also gradually metered (1.93 g/min.) into the reactor over a period of about 120 minutes to react with IA. The temperature of the reaction was maintained at about 80° C. for an additional four hours to complete the polymerization. About 17 grams of 35% $H_2O_2$ was added in 2 additions in 60 minutes interval as post treatment. The resulting copolymer of itaconic acid and acrylic acid product was cooled to room temperature and adjusted the product pH to 7-8 with 50% NaOH before discharging from the reactor.

Example 1

Laundry Slurry Formulation

Laundry slurry (LS) formulations containing inventive copolymers are selected for testing multifunctional capability (processing aid/chelating). Table 5 summarizes formulation composition of all slurries at <35% water content.

Procedure to make the slurry from LAS acid: To water and NaOH mixture, polymer was added. After the polymer was neutralized, LAS acid was gradually added to form detersive sodium LAS, followed by addition of soda ash. The rest of ingredients were then added and mixed thoroughly, while temperature was kept between 40° C. and 50° C., preferably at 45° C.

For Zeolite slurry preparation, Zeolite was added after adding soda ash. The temperature was controlled around 45° C.

For STTP (sodium tripolyphosphate) slurry preparation, STPP was added after adding soda ash. The temperature was controlled around 55° C.

Loop Test Results

To investigate viscosity change and stabilization of slurries, a loop test with 2 full cycles was performed at 60° C. using the conical concentric cylinders from 1 to 500 l/s at 60° C., two cycles.

TABLE 5

Slurry viscosity using loop test

| Formulation ID | | LS0 | LS1 | LS2 | LS3 | LS4 | LS5 | LS6 |
|---|---|---|---|---|---|---|---|---|
| Water(DI) | Solvent | 29.02 | 25.78 | 25.81 | 25.82 | 26.82 | 26.84 | 28.43 |
| Sodium hydroxide (50%) | Neutralizer | 5.43 | 6.43 | 6.43 | 6.43 | 6.02 | 6.43 | 5.07 |
| Calsoft LAS-99 (97.3%) | Surfactant acid form | 20.55 | 20.55 | 20.55 | 20.55 | 20.55 | 20.55 | 15.41 |
| Sample 4 (44.6%) | Chelator/ processing aid | 0 | 2.24 | 0 | 0 | 0 | 0 | 0 |
| Sample 6 (45.2%) | Chelator/ processing aid | 0 | 0 | 2.21 | 0 | 0 | 0 | 0 |
| Sample 2 (45.5%) | Chelator/ processing aid | 0 | 0 | 0 | 2.2 | 0 | 0 | 0 |

TABLE 5-continued

Slurry viscosity using loop test

| Formulation ID | | LS0 | LS1 | LS2 | LS3 | LS4 | LS5 | LS6 |
|---|---|---|---|---|---|---|---|---|
| CL3 | Chelator | 0 | 0 | 0 | 0 | 0 | 1.18 | 0 |
| CL2 | Chelator | 0 | 0 | 0 | 0 | 1.61 | 0 | 0 |
| CL4 | | 0 | 0 | 0 | 0 | 0 | 0 | 1.09 |
| Sodium Carbonate-Dense | Chelator/Buffer | 3.3 | 3.3 | 3.3 | 3.3 | 3.3 | 3.3 | 3.3 |
| Zeolite A (Valfor 100) | Chelator | 10 | 10 | 10 | 10 | 10 | 10 | 15 |
| Sodium Carbonate-Dense | Chelator/Buffer | 6.7 | 6.7 | 6.7 | 6.7 | 6.7 | 6.7 | 6.7 |
| Sodium Sulphate | Filler | 25 | 25 | 25 | 25 | 25 | 25 | 25 |
| Total | | 100 | 100 | 100 | 100 | 100 | 100 | 100 |
| Viscosity a 60° C. (Pa · s) at a shear rate of 500 (1/s)-from 1 to 500 1/s | | 0.61 | 0.82 | 0.78 | 0.73 | 1.42 | 0.92 | 0.85 |
| Viscosity a 60° C. (Pa · s) at a shear rate of 500 (1/s)-from 500 to 1 1/s | | 0.69 | 0.83 | 0.81 | 0.76 | 1.36 | 0.91 | 0.91 |
| Viscosity a 60° C. (Pa · s) at a shear rate of 500 (1/s)-from 1 to 500 1/s | | 2.08 | 1.17 | 1.19 | 1.34 | 1.5 | 0.96 | 1.2 |
| Viscosity a 60° C. (Pa · s) at a shear rate of 500 (1/s)-from 500 to 1 1/s | | 2.12 | 1.23 | 1.31 | 1.46 | 1.52 | 1.02 | 1.27 |

The results in table 5 show that partially esterified IA/AA polymer samples 2, 4 and 6 had lower viscosity as compared to control (LS0—No polymer) in the loop test. The control slurry viscosity increased over the cycles, indicating potential issue of slurry instability. The slurries with inventive polymers also had a lower viscosity as compared to CL2.

Table 6A and 6B below summarizes the viscosity data of slurries for water content of 26.96% and 25% $H_2O$, respectively.

TABLE 6A

Viscosity of slurries having 26.96% H2O

| Formulation ID | LS00 | LS7 | LS8 | LS9 | LS10 |
|---|---|---|---|---|---|
| Water (DI) | 24.52 | 22.26 | 22.44 | 22.26 | 22.29 |
| sodium hydroxide solution (50%) | 5.07 | 5.07 | 5.07 | 5.07 | 5.07 |
| Calsoft LAS-99 (97.3%) | 15.41 | 15.41 | 15.41 | 15.41 | 15.41 |
| Control Sample 1 | 0.00 | 2.26 | 0.00 | 0.00 | 0.00 |
| Sample 1 | 0.00 | 0.00 | 0.00 | 2.26 | 0.00 |
| Sample 5 | 0.00 | 0.00 | 0.00 | 0.00 | 2.23 |
| CL1 (48.12%) | 0.00 | 0.00 | 2.08 | 0.00 | 0.00 |
| Sodium Carbonate-Dense | 3.30 | 3.30 | 3.30 | 3.30 | 3.30 |

TABLE 6A-continued

Viscosity of slurries having 26.96% H2O

| Formulation ID | LS00 | LS7 | LS8 | LS9 | LS10 |
|---|---|---|---|---|---|
| Zeolite A (Valfor 100) | 20.00 | 20.00 | 20.00 | 20.00 | 20.00 |
| Sodium Carbonate-Dense | 6.70 | 6.70 | 6.70 | 6.70 | 6.70 |
| Sodium Sulphate | 25.00 | 25.00 | 25.00 | 25.00 | 25.00 |
| Total | 100.00 | 100.00 | 100.00 | 100.00 | 100.00 |
| Viscosity a 60° C. (Pa · s) at a shear rate of 500 (1/s)-from 1 to 500 1/s | 1.50 | 0.78 | 0.77 | 0.086 | 0.61 |
| Viscosity a 60° C. (Pa · s) at a shear rate of 500 (1/s)-from 500 to 1 1/s | 1.45 | 0.77 | 0.73 | 0.077 | 0.68 |
| Viscosity a 60° C. (Pa · s) at a shear rate of 500 (1/s)-from 1 to 500 1/s | 1.10 | 0.75 | 0.75 | 0.23 | 0.86 |
| Viscosity a 60° C. (Pa · s) at a shear rate of 500 (1/s)-from 500 to 1 1/s | 1.12 | 0.73 | 0.72 | 0.22 | 0.89 |

TABLE 6B

Viscosity of slurries having 25% H₂O

| Formulation ID | LS000 | LS11 | LS12 | LS13 | LS14 | LS15 | LS16 |
|---|---|---|---|---|---|---|---|
| Water(DI) | 22.25 | 19.90 | 19.90 | 19.62 | 19.87 | 19.92 | 19.98 |
| sodium hydroxide solution (50%) | 5.07 | 5.07 | 5.07 | 5.07 | 5.07 | 5.07 | 5.07 |
| Sample 3 (42.7%) | 0.00 | 2.35 | 0.00 | 0.00 | 0.00 | 0.00 | 0.00 |
| Sample 9 (42.52%) | 0.00 | 0.00 | 2.35 | 0.00 | 0.00 | 0.00 | 0.00 |
| Sample 8 (37.99%) | 0.00 | 0.00 | 0.00 | 2.63 | 0.00 | 0.00 | 0.00 |
| Sample 12 (44.1%) | 0.00 | 0.00 | 0.00 | 0.00 | 0.00 | 0.00 | 2.27 |
| Sample 14 (42.03%) | 0.00 | 0.00 | 0.00 | 0.00 | 2.38 | 0.00 | 0.00 |
| Sample 16 (43.0%) | 0.00 | 0.00 | 0.00 | 0.00 | 0.00 | 2.33 | 0.00 |
| Calsoft LAS-99 (97.3%) | 15.41 | 15.41 | 15.41 | 15.41 | 15.41 | 15.41 | 15.41 |
| Sodium Carbonate-Dense | 5.57 | 5.57 | 5.57 | 5.57 | 5.57 | 5.57 | 5.57 |
| Zeolite A (Valfor 100) | 20.00 | 20.00 | 20.00 | 20.00 | 20.00 | 20.00 | 20.00 |
| Sodium Carbonate-Dense | 6.70 | 6.70 | 6.70 | 6.70 | 6.70 | 6.70 | 6.70 |
| Sodium Sulphate | 25.00 | 25.00 | 25.00 | 25.00 | 25.00 | 25.00 | 25.00 |
| Total | 100.00 | 100.00 | 100.00 | 100.00 | 100.00 | 100.00 | 100.00 |
| Viscosity a 60° C. (Pa · s) at a shear rate of 500 (1/s)-from 1 to 500 1/s | 1.01 | 1.13 | 0.87 | 0.37 | 0.55 | 0.13 | 0.95 |
| Viscosity a 60° C. (Pa · s) at a shear rate of 500 (1/s)-from 500 to 1 1/s | 1.73 | 1.13 | 0.96 | 0.36 | 0.56 | 0.14 | 0.82 |
| Viscosity a 60° C. (Pa · s) at a shear rate of 500 (1/s)-from 1 to 500 1/s | 1.66 | 1.44 | 1.21 | 0.32 | 0.66 | 0.66 | 1.25 |
| Viscosity a 60° C. (Pa · s) at a shear rate of 500 (1/s)-from 500 to 1 1/s | 1.69 | 1.47 | 1.24 | 0.28 | 0.67 | 0.64 | 1.30 |

The results in tables 6A and 6B show that partially esterified IA/AA copolymer samples 3, 8, 9, 12, 14 and 16 had lower viscosity as compared to control (LS00 or LS000—no polymer). The slurries with inventive polymers also had a lower or equal viscosity as compared to CL1.

Table 7 below gives a summary of viscosities of slurries having a lower water content of 20% H₂O.

TABLE 7

Viscosity of slurries having 20% H₂O

| | Formulation ID | |
|---|---|---|
| | LS17 | LS18 |
| Water (DI) | 15.39 | 15.45 |
| sodium hydroxide solution (50%) | 5.34 | 5.34 |
| Sample 8 (37.99%) | 2.77 | 3.94 |
| Calsoft LAS-99 (97.3%) | 16.22 | 16.22 |
| Sodium Carbonate-Dense | 5.86 | 5.00 |
| Zeolite A (Valfor 100) | 21.05 | 21.05 |
| Sodium Carbonate-Dense | 7.05 | 7.00 |
| Sodium Sulphate | 26.32 | 26.00 |
| Total | 100.00 | 100.00 |
| Viscosity a 60° C. (Pa · s) at a shear rate of 500 (1/s)-from 1 to 500 1/s | 1.81 | 1.40 |
| Viscosity a 60° C. (Pa · s) at a shear rate of 500 (1/s)-from 500 to 1 1/s | 1.80 | 1.38 |
| Viscosity a 60° C. (Pa · s) at a shear rate of 500 (1/s)-from 1 to 500 1/s | 2.21 | 1.44 |
| Viscosity a 60° C. (Pa · s) at a shear rate of 500 (1/s)-from 500 to 1 1/s | 2.49 | 1.46 |

Slurry Viscosity Measurements Using Vane Spindle: Loop Test Results

The slurry viscosity was measured by TA AR-G2 with the vane spindle part No 546026.901, Bob length=42 mm, Bob diameter=28 mm. The slurry was evaluated by measuring viscosity versus shear rate to gain flow curve through loop test at the designated temperature. To investigate viscosity change and stabilization of slurries, a loop test with 2 or 3 full cycles was performed at 60° C. or 65° C. as indicated. The measurement was carried out with the vane spindle (part 546026.901) from 1 to 500 l/s at 60° C., two or 3 cycles or from 0.1 to 500 l/s at 65° C.

The following slurries were evaluated by use of the vane spindle upon 3 loop cycles.

TABLE 7A

Summary of Composition of Zeolite Detergent Slurries

| | Formulation ID | | | | |
|---|---|---|---|---|---|
| | LS0007A Control | LS19 | LS20 | LS21 | LS22 |
| Water (DI) | 23.90 | 21.6 | 20.99 | 21.97 | 21.88 |
| Sodium hydroxide solution (50%) | 5.63 | 5.63 | 5.63 | 5.63 | 5.63 |
| Sample 21 (43.46%) | 0.00 | 2.3 | 0.00 | 0.00 | 0.00 |
| Sample 24 (34.35%) | 0.00 | 0 | 2.91 | 0.00 | 0.00 |
| Sample 23 (49.53%) | 0.00 | 0 | 0.00 | 0.00 | 2.02 |
| Calsoft LAS-99 (97.3%) | 17.12 | 17.12 | 17.12 | 17.12 | 17.12 |
| Sodium Carbonate-Dense | 5.56 | 5.56 | 5.56 | 5.56 | 5.56 |
| Zeolite A (Valfor 100) | 8.89 | 8.89 | 8.89 | 8.89 | 8.89 |
| Sodium Carbonate-Dense | 5.56 | 5.56 | 5.56 | 5.56 | 5.56 |
| Sodium Sulphate | 33.34 | 33.34 | 33.34 | 33.34 | 33.34 |
| Total | 100.00 | 100.00 | 100.00 | 100.00 | 100.00 |
| Actual H20 | 27.71 | 26.71 | 26.71 | 26.71 | 26.71 |
| Viscosity at 60° C. (Pa · s) | | | | | |
| at 100 1/s | 2.572 | 1.588 | 1.54 | 2.61 | 2.36 |
| at 251.2 1/s | 1.44 | 0.8607 | 0.86 | 1.44 | 1.32 |
| at 500 1/s | 1.033 | 0.5997 | 0.57 | 0.94 | 0.85 |

* The viscosity was taken from 2nd loop.

From the viscosity data in the Table 7A, it is clear that all of the polymers tested gave a slurry with lower viscosities at a shear rate of 500 l/s than control although they had a water content 1% less than the control. Especially, the slurries with Sample 21 and 24 gave a viscosity below 1 Pa·s even at 251.2 l/s.

Table 7B lists the viscosity data of Zeolite-free detergent slurry.

TABLE 7B

Zeolite-free detergent slurry

| | Formulation ID | | | |
|---|---|---|---|---|
| | F0007B Control | CL5-7B | LS23 | LS24 |
| Water (DI) | 23.72 | 22.63 | 20.81 | 21.34 |
| sodium hydroxide solution (50%) | 6.39 | 6.39 | 6.39 | 6.39 |
| Sample 14 (42.03%) | 0.00 | 0.00 | 0.00 | 2.38 |
| Sample 24 (34.35%) | 0.00 | 0.00 | 2.91 | 0 |
| CL5 (Acrylic acid-maleic acid copolymer) | 0.00 | 1.09 | 0.00 | 0 |
| Calsoft LAS-99 (97.3%) | 19.43 | 19.43 | 19.43 | 19.43 |
| Sodium Carbonate-Dense | 12.62 | 12.62 | 12.62 | 12.62 |
| Sodium Sulphate | 37.84 | 37.84 | 37.84 | 37.84 |
| Total | 100.00 | 100.00 | 100.00 | 100.00 |
| Actual Total H2O | 28.01 | 27.01 | 27.01 | 27.01 |
| Viscosity at 60° C. (Pa · s) | | | | |
| at 100 1/s | 1.843 | slip* | 3.37 | 1.998 |
| at 251.2 1/s | 1.255 | slip* | 1.5 | 1.001 |
| at 500 1/s | 1.074 | slip* | 0.6966 | 0.6569 |

*The slurry became a soft matter

In Table 7B, the zeolite-free slurries with Sample 14 and sample 24 had a lower viscosity at a shear rate of 500 l/s as compared to the control slurry (F0007B). At the 2$^{nd}$ loop, the slurry with CL5 (acrylic acid-maleic acid copolymer) underwent a slip, and it was observed that the slurry became a soft matter when the spindle was raised from the cup.

Table 7C shows the viscosity of STPP detergent slurry. During slurry preparation, sample 31 resulted in lumpy slurry.

TABLE 7C

STPP Detergent Slurry

| | Formulation ID | |
|---|---|---|
| | LS25 | LS26 |
| Water (DI) | 23.58 | 23.58 |
| Sodium hydroxide solution (50%) | 4.60 | 4.60 |
| Sample 31 (35.48%) | 2.82 | 0.00 |
| Sample 27 (35.51%) | 0.00 | 2.82 |
| Calsoft LAS-99 (97.3%) | 14.00 | 14.00 |
| STPP | 20.00 | 20.00 |
| Sodium Carbonate-Dense | 5.00 | 5.00 |
| Zeolite A | 0.00 | 0.00 |
| Sodium Sulphate | 30.00 | 30.00 |
| Total | 100.00 | 100.00 |
| Actual H2O | 28.52 | 28.52 |
| Viscosity at 60° C. | | |
| 500 1/s (Pa · s) | 0.5799* | 1.59 |

*During the slurry preparation, this slurry with sample 31 looked to have a lumpy texture due to the polymer having surfactant side chain, but upon high shearing, its structure was easily broken. As a result, the viscosity at 500 1/s shear rate was low.

TABLE 7D

STPP Detergent Slurry (continued)

| | Formulation ID | | | | |
|---|---|---|---|---|---|
| | LS0007D Control | CL1-7D | LS27 | LS28 | LS29 |
| Water (DI) | 26.55 | 25.29 | 24.87 | | 24.37 |
| sodium hydroxide solution (50%) | 4.84 | 4.84 | 5.65 | 5.65 | 5.65 |
| CL1 (45.31%) | 0.00 | 2.21 | 0.00 | 0.00 | 0.00 |
| Sample 37 (35.57%) | 0.00 | 0.00 | 0.00 | 2.81 | 0.00 |
| Sample 14 (45%) | 0.00 | 0.00 | 2.22 | 0.00 | 0.00 |
| Sample 46 (36.81%) | 0.00 | 0.00 | 0.00 | 0.00 | 2.72 |
| Calsoft LAS-99 (97.3%) | 18.61 | 18.61 | 18.61 | 18.61 | 18.61 |
| STPP | 20.00 | 14.56 | 14.56 | 14.56 | 14.56 |
| Sodium Carbonate-Dense | 2.00 | 6.09 | 6.09 | 6.09 | 6.09 |
| Sodium Sulphate | 28.00 | 28.40 | 28.00 | 28.00 | 28.00 |
| Total | 100.00 | 100.00 | 100.00 | 100.00 | 100.00 |
| Actual H2O | 30.06 | 30.01 | 30.01 | 30.01 | 30.01 |
| Viscosity (65° C.) | | | | | |
| at 500 1/s | slip | 1.461 | 1.318 | 1.439 | 1.328 |
| at 1.256 1/s | 52.36 | 47.6 | 46.65 | 49.94 | 43.82* |

*At a shear rate of 1.581 1/s.

Table 7D lists the viscosity data of STPP-containing slurries having a water content of approximate 30% by weight. The slurries with samples 14, 37, 46 were smooth and gave a lower viscosity at a shear rate of 500 l/s. On the contrary, the control slurry (LS0007D) without any polymer had a slip and was not able to reach a stable viscosity value. At a lower shear rate, the slurries with samples 14, 37 and 46 had a lower viscosity as compared to the control. Overall, the results above indicate the benefit of addition of inventive polymer in reducing viscosity of STPP detergent slurry.

Table 7E lists the viscosity data of STPP detergent slurries with lower Na2CO3 but higher STPP weight % as compared to the compositions in Table 7D. Both samples 44 and 47 gave smooth slurries. This indicates that the polymer is robust and work for different compositions.

TABLE 7E

STPP Detergent Slurry (continued)

| | Formulation ID | |
|---|---|---|
| | LS30 | LS31 |
| Water (DI) | 24.02 | 24.25 |
| sodium hydroxide solution (50%) | 5.83 | 5.65 |
| Sample 44 (36.22%) | 2.76 | 0.00 |
| Sample 47 (36.89%) | 0 | 2.71 |
| Calsoft LAS-99 (97.3%) | 18.61 | 18.61 |
| STPP | 18.78 | 18.78 |
| Sodium Carbonate-Dense | 2.00 | 2.00 |
| Sodium Sulphate | 28.00 | 28.00 |
| Total | 100.00 | 100.00 |
| Actual H2O | 29.77 | 29.87 |
| Viscosity (65° C.) | | |
| at 500 1/s | 1.132 | 1.685 |
| at 1.581 1/s | 50.35 | 57.58 |

Table 7F below shows the slurry viscosity with 20% STPP. The control slurry cannot give a stable viscosity value, which could be due to the instability of slurry upon shearing. The slurries made with sample 14 gave a stable viscosity value and smooth slurry. The stable and smooth slurry can make the processing much easier.

TABLE 7F

STPP Detergent Slurry with 20% STPP

| | Formulation ID | | |
|---|---|---|---|
| | F0007F Control | LS32 | LS33 |
| Water (DI) | 25.38 | 23.16 | 19.76 |
| sodium hydroxide solution (50%) | 6.01 | 6.01 | 7.18 |
| Sample 14 (45.0%) | 0 | 2.22 | 4.44 |
| Calsoft LAS-99 (97.3%) | 18.61 | 18.61 | 18.61 |
| STPP | 20.00 | 20.00 | 20.00 |
| Sodium Carbonate-Dense | 2.00 | 2.00 | 2.00 |
| Sodium Sulphate | 28.00 | 28.00 | 28.00 |
| Total | 100.00 | 100.00 | 100.00 |
| Actual H2O | 30.00 | 28.68 | 27.36 |
| Viscosity at 500 (1/s) Pa · s at 60° C. | unstable | 1.30 | 1.522 |
| Viscosity at 10 (1/s) Pa · s at 60° C. | unstable | 16.7 | 20.26 |

Example 1b

Hydrophobic and Hydrophilic Particulates Dispersion

The dispersing ability was tested by use of hydrophobic particulates-carbon black and hydrophilic particulates-Kaolin clay at room temperature. The water hardness is 120 ppm as $CaCO_3$ and the concentration of polymer is 10 ppm. To a glass jar, both of polymer solution and hard water were added and mixed to get the right concentration, and then particulate soil was added. The mixture was mixed for 5 min to form dispersion. Then the Transmission (T %) or Turbidity (NTU) of the dispersion over a certain time period was measured. The lower the T %, the higher the dispersing ability. With NTU, a higher NTU value indicates a higher dispersing ability. The results are listed in Table 8.

TABLE 8

Dispersion stability at Room Temperature

| | T % of Carbon Black dispersion | | Turbidity (NTU) of Kaolin dispersion | |
|---|---|---|---|---|
| Sample ID | Initial | 5 min | Initial | 5 min |
| Sample 4 | 29.4 | 65.9 | 1000 | 469 |
| Sample 8 | 31.8 | 58.4 | NT | NT |
| CL3 | 32.6 | 67 | 628 | 270 |
| CL4 | 52.7 | 72.6 | 816 | 146 |
| CL1 | 6 | 58.2 | 1000 | 848 |
| No polymer | 39.3 | 60.3 | 850 | 330 |

Water hardness is 120 ppm and polymer concentration is 10 ppm

Samples 4 and 8 showed better Carbon black dispersing ability than CL3 and CL4, and sample 4 showed better dispersing ability of Kaolin clay than CL3 and CL4.

Example 1C

Antiencrustation

As an index of antiencrustation, $CaCO_3$ crystal growth inhibition was evaluated at room temperature by measuring turbidity. Polymer solution and $Na_2CO3$ solution were mixed together, and then hard water was added to make the final solution having a water hardness of 300 ppm and 0.15% $Na_2CO_3$. The solution was kept mixing and the turbidity was monitored over the time. The lower the turbidity (NTU), the higher the $CaCO_3$ crystal growth inhibition efficacy. Some results are listed Table below. Cleary, the inventive polymer showed better $CaCO_3$ crystal inhibition than CL3 and CL5.

TABLE 9

Antiencrustation (Crystal Growth Inhibition)

| Polymer | Concentration, ppm | Turbidity (NTU) at 35 min | Turbidity (NTU) at 40 min | Turbidity (NTU) at 45/50 min |
|---|---|---|---|---|
| Sample 8 | 2.5 | 1.50 | — | — |
| Sample 9 | 2.5 | 1.98 | — | — |
| Sample 14 | 2.5 | 0.80 | — | — |
| Sample 20 | 5.0 | — | — | 1.39 |
| Sample 22 | 5.0 | — | 0.58 | 0.85 |
| Sample 23 | 5.0 | — | 0.56 | 0.58 |
| Sample 25 | 5.0 | — | 1.1 | — |
| Sample 27 | 5.0 | — | 1.69 | — |
| Sample 38 | 5.0 | — | 0.75 | — |
| Sample 41 | 5.0 | — | 0.7 | 0.8 |
| Sample 42 | 5.0 | — | 0.7 | 0.5 |
| Sample 43 | 5.0 | — | 0.64 | 0.5 |
| Sample 44 | 5.0 | — | 0.56 | 0.98 |
| Sample 46 | 5.0 | — | — | 0.9 |
| Sample 47 | 5.0 | — | — | 0.9 |
| CL3 | 30 | 93 | — | — |
| CL5 | 2.5 | 13 | — | — |
| No polymer | 0.0 | 280 | 278 | — |

Example 1D

Laundry Detergency Test

Laundry Detergency Testing:

With the model base powder, the inventive copolymers are selected for testing the cleaning efficiency by post-dosing polymer into wash liquor under appropriate water hardness conditions by using a Tergotometer. Test formulations were used to wash pre-soiled "test cloths" together under standard conditions. The soiled fabrics were used to supply soil to the system and also to measure the cleaning efficiency of the formulations. After washing, the test cloths were rinsed, dried, and their reflectance was measured by Hunter Labscan XE.

General Test Conditions—

Hard Water Stock Solution-3000 ppm water hardness—Prepare a hard water stock solution by dissolving 2.938 g of calcium chloride dihydrate ($CaCl_2.2H_2O$) and 2.031 g of magnesium chloride hexahydrate ($MgCl_2.6H_2O$) in deionized water to a volume of 1 L. This solution contains 3000 ppm hardness (expressed as calcium carbonate) with a Ca:Mg molar ratio of 2:1. The 300 ppm solution is made by taking 100 ml of the stock solution and diluting with water to 1 L. The 150 ppm solution is made by taking 50 ml of the stock solution and diluting with water to 1 L.

Test Cloths: The soiled test cloths are STC EMPA standard soils for detergency test, 3 in.×4 in. 4 soiled test cloths and 1 white cotton cloth are included in each bin of the wash test.

Detergency Test Procedure

1) Allow Tergotometer bath to equilibrate to the designated temperature.
2) Add 1 L of hard water with the designated water hardness to each bin and allow to equilibrate to the designated temperature.
3) Add the designated amount of detergent to each bin and agitate for 1 minute and then add designated polymer (as TS) into the bin and mix for 2 to 3 min to make sure it is dissolved.
4) Add pre-measured swatches to each bin for cleaning
5) Wash swatches for 15 minutes
6) Dump wash water and squeeze out the water from swatches
7) Rinse bin and shaft with DI water
8) Add 1 L the designated hard water to each bin and allow to equilibrate to the designated temperature.
9) Unfold swatches and place in same bin as before
10) Rinse for 3 minutes
11) Squeeze out the water from swatches, unfold and allow to dry
12) Measure swatches when dry The reflectance values of the swatches are measured (full spectrum with ultraviolet excluded) before and after the wash. Each swatch was measured three times and then averaged.

A Hunter reflection meter was used to measure L, a, and b values. These values were taken to calculate ΔE values using the following equation:

$$\Delta E = [(L_w - L_b)^2 + (a_w - a_b)^2 + (b_w - b_b)^2]^{1/2}$$

where:
L=reflectance (white/black),
a=redness/greenness,
b=yellowness/blueness,
w=washed fabric, and
b=soiled fabric.

The changes of a and b indicate the color changes. The values indicate the distance of color changes before and after washing in L, a, and b color domain.

The higher ΔE value indicates a higher detergency for soil/stain removal under the tested conditions.

Model Laundry Detergent Base Powder Composition Via Microwave Oven Drying.

The example listed in Table 9A is a formulation of Laundry Detergent Base Powders. The other ingredients, such enzymes, whitening agent, fragrance, dye and other minor ingredients may be posted blending with the base powders. The slurry of this base powder was prepared by the following process:

1) Added DI water, NaOH aqueous solution to a beaker.
2) Added alkyl benzene sulfonic acid (Calsoft LAS-99) while mixing. The alkyl benzene sulfonic acid was neutralized by NaOH to form sodium alkyl benzene sulfonate.
3) Added sodium carbonate and followed by adding Zeolite A, while kept mixing and maintaining the temperature around 50° C.
4) Added sodium sulfate and kept mixing until smooth and homogeneous slurry was obtained.
5) Then the slurry was loaded into glassware and placed into microwave oven to dry; The dried slurry was ground to the desired size.
6) To the model powder, other ingredients such as enzyme granule(s), whitening agent, perfume, dye or other beneficial ingredients can be post-dosed by a quick mixing to ensure the well distribution of ingredients.

The following model base powder detergent was used to evaluate the detergency.

TABLE 9A

| Model Base Powder Detergent | |
|---|---|
| Raw material | % by weight |
| Water (DI) | 1.37 |
| Na LAS | 15.00 |
| Sodium Carbonate-Dense | 18.67 |
| Zeolite A (Valfor 100) | 13.41 |
| Sodium Sulphate | 51.55 |
| Total | 100.00 |

The Table 9B summarizes the ΔE values of tested base powder with inventive polymers along with model base powder. The base powder dosage was 1.1 g/L and polymer was 0.030 g/L (as TS), washing temperature was 70° F., water hardness was 300 ppm, and washing time was 15 min.

TABLE 9B

The ΔE values of washed swatches in the absence and presence of polymer

| Soiled clothes | Soil nature | Base powder | 30 ppm Sample 31 | 30 ppm Sample 27 |
|---|---|---|---|---|
| EMPA 101 | cotton with carbon black/olive oil | 16.54 | 18.62 | 19.75 |
| EMPA 104 | polyester/cotton with carbon black/oliver oil | 13.96 | 14.65 | 14.96 |
| EMPA 106 | cotton with IEC carbon black/mineral oil | 6.65 | 7.18 | 7.82 |
| EMPA 118 | cotton with sebum/pigment | 5.81 | 6.11 | 5.47 |

The ΔE values of EMPA 101 and EMPA104 were increased with the addition of polymers in table 9B. Especially, addition of polymers significantly increased EMPA101 soil removal in view of the increased ΔE values. This indicates that polymers aid in particulate soil removal on cotton fabric.

Table 9C lists the Average ΔE values of model base powder with various concentration of Sample 14 in the wash liquor along with the base without polymer. The ΔE values of EMPA101 and EMPA111 in the table 9C indicate that an addition of polymer (sample 14) enhances the removal of EMPA101 and EMPA 111 soils. For removal of other soils, polymer at 1% level had no significant negative impact.

TABLE 9C

The ΔE values of mode base powder with addition of polymer along with base powder

| Soiled cloth | Soil nature | 0% (No polymer) | 0.5% Sample 14 | 1.0% Sample 14 |
|---|---|---|---|---|
| EMPA 101 | cotton with carbon black/olive oil | 16.54 | 18.04 | 17.13 |
| EMPA 104 | polyester/cotton with carbon black/oliver oil | 13.96 | 13.61 | 13.65 |

TABLE 9C-continued

The ΔE values of mode base powder with addition of polymer along with base powder

| Soiled cloth | Soil nature | 0% (No polymer) | 0.5% Sample 14 | 1.0% Sample 14 |
|---|---|---|---|---|
| EMPA 106 | cotton with IEC carbon black/mineral oil | 6.65 | 5.97 | 6.6 |
| EMPA 118 | cotton with sebum/pigment | 5.81 | 5.69 | 5.25 |
| EMPA 111 | cotton with pig blood | 30.78 | 33.18 | 34.1 |
| EMPA 112 | cotton with cocoa | 8.15 | 5.98 | 7.77 |
| EMPA 116 | cotton with blood/milk/ink | 11.2 | 11.04 | 11.46 |
| EMPA 117 | polyester/cotton with blood/milk/ink | 9.97 | 10.76 | 10.49 |

Washing conditions: detergent powder dosage is 1.1 g/L, washing temperature is 70° F. and water hardness is 300 ppm, washing time 15 min The ΔE values in table 9D show that an increase in polymer concentration increases the ΔE value of Grass stain and EMPA101. As compared with the model base powder, addition of polymer improves the cleaning efficiency of EMPA101 and Grass stains.

TABLE 9D

The ΔE values with addition of polymer at different levels

| | | Sample 14 polymer added (ppm) | | | |
|---|---|---|---|---|---|
| Stains | Soil nature | 0 | 10 | 30 | 50 |
| EMPA101 | cotton with carbon black/olive oil | 17.89 | 20.31 | 19.4 | 19.19 |
| EMPA118 | cotton with sebum/pigment | 5.18 | 6.22 | 5.93 | 6.08 |
| EMPA116 | cotton with blood/milk/ink | 13.3 | 13.12 | 13.96 | 13.46 |
| Grass | cotton with grass stain | 3.48 | 4.00 | 4.34 | 4.66 |

Washing conditions: model base powder 0.70 g/L, washing temperature 90° F., washing time 15 min, water hardness 150 ppm.

Example 2

Dish Formulations

Tables 10 and 11 below show that ADW powder formulations and performance with partially esterified copolymer samples. Table 11 below provides spotting and filming performance of the automatic dish washer ("ADW") powder formulations of Table 10 after 5 dishwashing cycles

TABLE 10

Partially esterified copolymer vs. CL3.

| Ingredient/wt, g | Function | Sample 30 | DF1 |
|---|---|---|---|
| Sodium citrate | Builder | 3 | 3 |
| Chelating polymer (Sample 30) | Polymer builder | 2.6 | 0 |
| CL3 | Polymer Builder | 0 | 2.6 |
| CL4 | Anti-filming polymer | 0 | 0.06 |
| Sodium carbonate, dense 260, FMC | Buffer | 3 | 3 |
| Plurafac SLF 180, BASF | Nonionic surfactant | 0.6 | 0.6 |
| Sodium percarbonate, Aldrich | Bleach | 2.4 | 2.4 |
| TAED, 90%, Acros | Bleach Activator | 0.4 | 0.4 |
| Sodium Disilicate, Britesil H20, PQ | Corrosion inhibitor | 0.6 | 0.6 |
| Savinase 6.0T, Novozymes | Protease enzyme | 0.1 | 0.1 |
| Termamyl 120T, Novozymes | Amylase enzyme | 0.1 | 0.1 |
| Sodium Sulfate, Mallinckrodt | | 7.2 | 7.14 |
| Total | Filler | 20 g | 20 g |

TABLE 11

Partially esterified copolymer vs. CL3.

| | Sample 2 | DF1 |
|---|---|---|
| Glass (Spotting + Filming) | 5.17 | 7 |
| Plastic (Spotting + Filming) | 6.5 | 9.5 |

Tables 10 and 11 show that ADW powder formulations with partially esterified copolymer samples provide better spotting and filming performance on glass compared to a formula with CL3 (DF1).

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements. As used herein, the transitional term "comprising," which is synonymous with "including," "containing," or "characterized by," is inclusive or open-ended and does not exclude additional, un-recited elements or method steps. However, in each recitation of "comprising" herein, it is also intended that the term encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

What is claimed is:

1. A polymer builder comprising monomer units derived from itaconic acid and from about 0.01 to about 4 mole % polymerization initiator, based on the total amount of monomer, wherein no more than 20 mole % of the total carboxylic acid groups from all monomers are neutralized and said polymer is substantially free of tri-substituted vinyl monomer impurities and substantially free of phosphorous components, and wherein from about 0.1 to about 60% of the total acid groups from all monomers in the polymer are either esterified, contain an ether linkage, or a combination thereof.

2. The polymer of claim 1 comprising greater than about 25 mole % monomers derived from itaconic acid and less than about 75 mole % monomer derived from at least one of acrylic acid, methacrylic acid, AMPS, sodium styrene sulfonate, salts thereof, esters thereof, allyl ether monomers, and combinations thereof.

3. The polymer of claim 1 having a number average molecular weight (Mn) of from about 500 to 100,000.

4. The polymer of claim 1 having a number average molecular weight (Mn) of from about 100 to about 500.

5. The polymer of claim 1 comprising monomer units derived from itaconic acid at from about 30 to about 60 mole % and monomer units derived from acrylic acid at from about 40 to about 70 mole %.

6. The polymer of claim 1 comprising monomer units derived from itaconic acid at from about 60 to about 70 mole % and monomer units derived from acrylic acid at from about 30 to about 40 mole %.

7. The polymer of claim 1 comprising monomer units derived from itaconic acid at from about 35 to about 70 mole %, monomer units derived from acrylic acid at from about 15 to about 30 mole % and monomer units derived from AMPS and/or sodium styrene sulfonate at from about 0.1 to about 20 mole %.

8. The polymer of claim 1 comprising monomer units derived from itaconic acid and (meth)acrylic acid at from about 90 to about 99.9 mole % and monomer units derived from AMPS and/or sodium styrene sulfonate at from about 0.1 to about 10 mole %.

9. The polymer of claim 1, comprising greater than 25 mole % monomer units derived from itaconic acid; less than 75 mole % monomer units derived from acrylic acid; and less than 10 mole % of (meth)acrylic acid ester monomer units, allyl ether monomer units, and combinations thereof.

10. The polymer of claim 1, further comprising a starch additive, polyvinyl alcohol additive of less than 100,000 Mn, polyhydric alcohol additive, or mixtures thereof.

11. The polymer of claim 1, where the polymer is from about 0.1 to about 60% esterified.

12. The polymer of claim 1, wherein from 0.1 to about 20 mol % of the monomers in the polymer are derived from allyl ether monomers.

13. A process for preparing a polymer solution of the itaconic acid polymer of claim 1 comprising: preparing a monomer solution of a monomer in an aqueous medium, pre-neutralizing said monomer solution with less than 20 mole % of a neutralizer per total acid group present within said monomer solution, wherein said monomer solution comprises itaconic acid monomer and polymerizing said monomer at a polymerization temperature of greater than about 60° C. in the presence of from about 0.01 to about 4 mole % polymerization initiator, based on the total amount of said monomer.

14. The process of claim 13 wherein the monomer solution is held at a polymerization temperature of less than 100° C.

15. The process of claim 13 wherein said initiator is a redox system wherein said redox system comprises a sodium persulfate oxidizer and a reducer comprising a mixture of a disodium salt of 2-hydroxy-2-sulfinatoacetic acid and sodium sulfite.

16. The process of claim 13, wherein the process additionally comprises a step of pre-neutralizing said monomer solution with less than 5 mole % of a neutralizer per total acid group present within said monomer solution.

17. A method of chelating metal ions from a solution comprising adding to a solution containing metal ions, or subject to containing metal ions, an esterified polymer according to claim 1.

* * * * *